(12) United States Patent
Nixon et al.

(10) Patent No.: US 9,730,078 B2
(45) Date of Patent: Aug. 8, 2017

(54) CONFIGURING AND OPTIMIZING A WIRELESS MESH NETWORK

(75) Inventors: Mark J. Nixon, Round Rock, TX (US); John M. Lucas, Leicester (GB)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 0 days.

(21) Appl. No.: 12/201,734

(22) Filed: Aug. 29, 2008

(65) Prior Publication Data
US 2009/0059814 A1 Mar. 5, 2009

Related U.S. Application Data

(60) Provisional application No. 60/969,420, filed on Aug. 31, 2007.

(51) Int. Cl.
*H04W 16/18* (2009.01)
*H04L 12/24* (2006.01)
(Continued)

(52) U.S. Cl.
CPC ............. *H04W 16/18* (2013.01); *H04L 41/12* (2013.01); *H04L 41/22* (2013.01); *H04L 45/122* (2013.01);
(Continued)

(58) Field of Classification Search
None
See application file for complete search history.

(56) References Cited

U.S. PATENT DOCUMENTS 5,202,985 A 4/1993 Goyal
5,596,704 A 1/1997 Geddes et al.
(Continued)

FOREIGN PATENT DOCUMENTS

CN 1561509 A 1/2005
GB 2 427 797 1/2007
(Continued)

OTHER PUBLICATIONS

Song et al., "A Study of Process Data Transmission Scheduling in Wireless Mesh Networks," ISA Expo 2007 Technical Conference (Sep. 2007).
(Continued)

*Primary Examiner* — Rina Pancholi
(74) *Attorney, Agent, or Firm* — Marshall, Gerstein & Borun LLP

(57) ABSTRACT

An interactive software-based network design tool that may be used to simulate and view the operation of a wireless mesh device network used in a process plant, such as a wireless HART device network, allows a user to create a model of a wireless network, input several design requirements, and automatically generate and view communication routes and schedules for the wireless network. The network design tool provides an interactive graphic interface for the addition, removal, and positioning of nodes and devices within the wireless network and a menu including several interactive screens for specifying threshold values, network topology selections, routing preferences, and other configuration parameters related to generating and optimizing communication routes and schedules within the wireless mesh network. The network design tool automatically applies a set of optimization rules along with the parameters input by user to the network model in order to generate efficient network configuration data.

61 Claims, 22 Drawing Sheets

(51) Int. Cl.
   *H04L 12/733* (2013.01)
   *H04W 40/10* (2009.01)
   *H04W 40/16* (2009.01)
   *H04W 84/18* (2009.01)

(52) U.S. Cl.
   CPC ............ *H04W 40/10* (2013.01); *H04W 40/16* (2013.01); *H04W 84/18* (2013.01); *Y02B 60/50* (2013.01); *Y02P 90/18* (2015.11); *Y02P 90/185* (2015.11); *Y02P 90/20* (2015.11); *Y02P 90/26* (2015.11)

(56) References Cited

U.S. PATENT DOCUMENTS

| | | | |
|---|---|---|---|
| 5,926,531 A | 7/1999 | Petite | |
| 6,028,522 A | 2/2000 | Petite | |
| 6,058,260 A | 5/2000 | Brockel et al. | |
| 6,218,953 B1 | 4/2001 | Petite | |
| 6,233,327 B1 | 5/2001 | Petite | |
| 6,236,334 B1 | 5/2001 | Tapperson et al. | |
| 6,323,882 B1 | 11/2001 | Jerome et al. | |
| 6,430,268 B1 | 8/2002 | Petite | |
| 6,437,692 B1 | 8/2002 | Petite et al. | |
| 6,442,512 B1 | 8/2002 | Sengupta et al. | |
| 6,442,515 B1 | 8/2002 | Varma et al. | |
| 6,522,974 B2 | 2/2003 | Sitton | |
| 6,618,578 B1 | 9/2003 | Petite | |
| 6,628,764 B1 | 9/2003 | Petite | |
| 6,747,557 B1 | 6/2004 | Petite et al. | |
| 6,836,737 B2 | 12/2004 | Petite et al. | |
| 6,914,533 B2 | 7/2005 | Petite | |
| 6,914,893 B2 | 7/2005 | Petite | |
| 7,053,767 B2 | 5/2006 | Petite et al. | |
| 7,079,810 B2 | 7/2006 | Petite et al. | |
| 7,103,511 B2 | 9/2006 | Petite | |
| 7,137,550 B1 | 11/2006 | Petite | |
| 7,209,840 B2 | 4/2007 | Petite et al. | |
| 7,263,073 B2 | 8/2007 | Petite et al. | |
| 7,295,128 B2 | 11/2007 | Petite | |
| 7,346,463 B2 | 3/2008 | Petite et al. | |
| 7,375,594 B1 | 5/2008 | Lemkin et al. | |
| 7,397,907 B2 | 7/2008 | Petite | |
| 7,420,980 B1 | 9/2008 | Pister et al. | |
| 7,468,651 B2 | 12/2008 | DeLine et al. | |
| 7,468,661 B2 | 12/2008 | Petite et al. | |
| 7,613,105 B2* | 11/2009 | Bahl et al. | 370/216 |
| 7,650,425 B2 | 1/2010 | Davis et al. | |
| 7,676,154 B2* | 3/2010 | Vukovic et al. | 398/57 |
| 7,697,492 B2 | 4/2010 | Petite | |
| 7,978,059 B2 | 7/2011 | Petite et al. | |
| 8,013,732 B2 | 9/2011 | Petite et al. | |
| 8,064,412 B2 | 11/2011 | Petite | |
| 8,126,477 B2* | 2/2012 | Dravida et al. | 455/456.3 |
| 8,503,336 B2* | 8/2013 | Rappaport et al. | 370/277 |
| 2002/0013679 A1 | 1/2002 | Petite | |
| 2002/0031101 A1 | 3/2002 | Petite et al. | |
| 2002/0042274 A1* | 4/2002 | Ades | 455/445 |
| 2002/0099806 A1* | 7/2002 | Balsamo et al. | 709/223 |
| 2002/0173272 A1* | 11/2002 | Liang | H04W 72/1215 455/63.1 |
| 2003/0063585 A1 | 4/2003 | Younis et al. | |
| 2004/0075689 A1 | 4/2004 | Schleiss et al. | |
| 2004/0143428 A1 | 7/2004 | Rappaport et al. | |
| 2004/0183687 A1 | 9/2004 | Petite et al. | |
| 2004/0214572 A1* | 10/2004 | Thompson et al. | 455/435.2 |
| 2004/0230582 A1 | 11/2004 | Pagnano et al. | |
| 2005/0085928 A1* | 4/2005 | Shani | 700/18 |
| 2005/0091482 A1* | 4/2005 | Gray et al. | 713/151 |
| 2005/0136972 A1* | 6/2005 | Smith et al. | 455/554.1 |
| 2005/0171746 A1 | 8/2005 | Thalhammer-Reyero | |
| 2005/0204028 A1 | 9/2005 | Bahl et al. | |
| 2005/0213612 A1 | 9/2005 | Pister et al. | |
| 2005/0240386 A1 | 10/2005 | Carballo et al. | |
| 2005/0276233 A1* | 12/2005 | Shepard et al. | 370/254 |
| 2006/0029060 A1 | 2/2006 | Pister | |
| 2006/0029061 A1 | 2/2006 | Pister et al. | |
| 2006/0083186 A1* | 4/2006 | Handforth et al. | 370/310 |
| 2006/0133285 A1* | 6/2006 | Tantsis et al. | 370/244 |
| 2006/0159020 A1* | 7/2006 | Porat | 370/235 |
| 2006/0276195 A1 | 12/2006 | Nordling | |
| 2007/0038321 A1 | 2/2007 | McDonald et al. | |
| 2007/0054670 A1 | 3/2007 | Kalika et al. | |
| 2007/0160000 A1 | 7/2007 | Dobrowski et al. | |
| 2007/0161367 A1* | 7/2007 | Dobrowski et al. | 455/412.1 |
| 2007/0161371 A1 | 7/2007 | Dobrowski et al. | |
| 2007/0162669 A1* | 7/2007 | Martin et al. | 710/72 |
| 2007/0169047 A1* | 7/2007 | Na et al. | 717/151 |
| 2007/0237081 A1* | 10/2007 | Kodialam et al. | 370/235 |
| 2007/0280287 A1 | 12/2007 | Samudrala et al. | |
| 2008/0037442 A1* | 2/2008 | Bill | 370/254 |
| 2008/0037482 A1* | 2/2008 | Douglas et al. | 370/338 |
| 2008/0192713 A1* | 8/2008 | Mighani et al. | 370/338 |
| 2008/0249641 A1* | 10/2008 | Enver | G05B 19/042 700/9 |
| 2008/0273486 A1 | 11/2008 | Pratt et al. | |
| 2008/0273518 A1 | 11/2008 | Pratt et al. | |
| 2008/0274766 A1 | 11/2008 | Pratt et al. | |
| 2008/0279155 A1 | 11/2008 | Pratt, Jr. et al. | |
| 2008/0279204 A1 | 11/2008 | Pratt, Jr. et al. | |
| 2008/0285582 A1 | 11/2008 | Pister et al. | |
| 2009/0010203 A1 | 1/2009 | Pratt, Jr. et al. | |
| 2009/0010204 A1 | 1/2009 | Pratt, Jr. et al. | |
| 2009/0010205 A1 | 1/2009 | Pratt, Jr. et al. | |
| 2009/0010233 A1 | 1/2009 | Pratt, Jr. et al. | |
| 2009/0046675 A1 | 2/2009 | Pratt, Jr. et al. | |
| 2009/0046732 A1 | 2/2009 | Pratt, Jr. et al. | |
| 2009/0052429 A1 | 2/2009 | Pratt, Jr. et al. | |
| 2009/0054033 A1 | 2/2009 | Pratt, Jr. et al. | |
| 2009/0068947 A1 | 3/2009 | Petite | |
| 2009/0315699 A1* | 12/2009 | Satish et al. | 340/533 |
| 2010/0110916 A1 | 5/2010 | Pratt, Jr. et al. | |
| 2010/0194582 A1 | 8/2010 | Petite | |
| 2010/0312881 A1 | 12/2010 | Davis et al. | |
| 2011/0216656 A1 | 9/2011 | Pratt, Jr. et al. | |
| 2011/0264324 A1 | 10/2011 | Petite et al. | |
| 2011/0302635 A1 | 12/2011 | Pratt, Jr. et al. | |
| 2011/0309953 A1 | 12/2011 | Petite et al. | |
| 2011/0320050 A1 | 12/2011 | Petite et al. | |

FOREIGN PATENT DOCUMENTS

| | | |
|---|---|---|
| GB | 2 431 553 | 4/2007 |
| JP | 2003132476 A | 5/2003 |
| JP | 2005216292 A | 8/2005 |
| JP | 2007150756 A | 6/2007 |
| JP | 2007536632 A | 12/2007 |
| WO | WO-00/55825 A1 | 9/2000 |
| WO | WO-01/35190 A2 | 5/2001 |
| WO | WO-02/13036 A1 | 2/2002 |
| WO | WO-02/13412 A1 | 2/2002 |
| WO | WO-02/13413 A1 | 2/2002 |
| WO | WO-02/13414 A1 | 2/2002 |
| WO | WO-02/075565 A1 | 9/2002 |
| WO | WO-2004086783 A1 | 10/2004 |
| WO | WO-2005/109122 A1 | 11/2005 |
| WO | WO-2005/109123 A1 | 11/2005 |
| WO | WO-2007126610 A2 | 11/2007 |
| WO | WO-2008/127631 A1 | 10/2008 |

OTHER PUBLICATIONS

European Search Report for Application No. EP08163422, dated Jul. 8, 2009.
Office Action for Chinese Patent Application No. 200610139719.9, dated Jan. 8, 2010.
Search Report for Application No. GB0815878.4, dated Nov. 26, 2008.
Annunziata et al., "NETPLAN: A Rule Based System to Design Packet Switching Data Networks," *Microprocessing and Microprogramming*, 27(1-5):749-756 (1989).
European Examination Report for Application No. 08163422.2, dated Apr. 1, 2011.

(56) References Cited

OTHER PUBLICATIONS

Examination Report for GB0815878.4 mailed Sep. 30, 2011.
Office Action for Japanese Patent Application No. 2008-223390 dated Nov. 13, 2012.
Tonnerre et al., "Mesh Networking for Low-Rate Systems," IEEE 15-06-0238-00-0005, IIEEE mentor, May 15, 2006.
Examination Report for GB1201554.1 mailed Feb. 27, 2012.
Examination Report for GB1201553.3 mailed Feb. 27, 2012.
Examination Report for GB0815878.4 mailed Feb. 27, 2012.
Office Action for Chinese Patent Application No. 200810213725.3, dated Jan. 31, 2012.
"D1100 SmartMesh Network Release 1.0 Engineering Software Specifications," Dust Networks, Dec. 17, 2011, 36 pages.
"D1100 SmartMesh Network Release 1.0 Engineering Software Specifications," Dust Networks, 36 pages.
"Multiple Interpenetrating MultiDiGraphs," Dust Incorporated, 12 pages. (Powerpoint).
"SmartMesh-XT CLI Commands Guide," Dust Networks, Inc., Jun. 27, 2007, 36 pages.
SmartMesh-XT KT1030/KT2135/KT2030 Evaluation Kit Guide, Dust Networks, Inc., Nov. 2, 2007, 58 pages.
"SmartMesh-XT M2135-2, M2030-2 2.4 GHz Wireless Analog/Digital/Serial Motes," Dust Networks, Inc., Mar. 28, 2007, 33 pages.
SmartMesh-XT Manager XML API Guide, Dust Networks, Inc., Apr. 4, 2007, 148 pages.
"System Description for Security Review SmartMesh Alba," Dust Networks, 36 pages.
Pratt et al., U.S. Appl. No. 13/444,350, filed Apr. 11, 2012.
European Search Report for Application No. EP13163021.2, dated May 14, 2013.
Office Action for Chinese Patent Application No. 200810213725.3, dated Oct. 8, 2014.
Office Action for Chinese Patent Application No. 200810213725.3, dated Apr. 1, 2014.
Office Action for Japanese Patent Application No. 2013-76610, dated Apr. 1, 2014.
Notice of Reexamination for corresponding Japanese Application No. 200810213725.3, dated Jul. 1, 2015.
Office Action for European Patent Application No. 08163422.2, dated Aug. 26, 2014.
Office Action for European Application No. 08163422.2 dated Nov. 5, 2015.
Notice of Reexamination for Chinese Application No. 200810213725.3 dated Jul. 1, 2015.
Office Action for European Patent Application No. 08 163 422.2, dated Dec. 1, 2016.
Office Action for European Patent Application No. 13 163 021.2, dated Dec. 1, 2016.

* cited by examiner

FIG. 16A

Schedule

▼ ChannelMap
▼ NetworkDevice (10)

| = address | = type | = id | ◁ = Comment | ◇ Frames |
|---|---|---|---|---|
| 1 | Gateway | 0xE676A8E5CCED5000 | Frames | ▼ Frames ▶ Frame (6) |
| 2 | Device | 0x6D2654I6DA4CA800 | Frames | ▼ Frames ▶ Frame (5) |
| 3 | Device | 0xE72567EFCE4AD000 | Frames | ▼ Frames ▶ Frame (4) |
| 4 | Device | 0xA1AA09F435B40D00 | Frames | ▼ Frames ▶ Frame (4) |
| 5 | Device | 0x125269B424A4D300 | Frames | ▼ Frames ▶ Frame (3) |
| 6 | Device | 0x5D5DB548BAB36C00 | Frames | ▼ Frames ▶ Frame (2) |
| 7 | Device | 0x63C82A6CC7905400 | Frames | ▼ Frames ▶ Frame (2) |
| 8 | Router | 0xA8AE3BEF515C7800 | Frames | ▼ Frames ▶ Frame (4) |
| 9 | Router | 0xE13F8F1FC27F2000 | Frames | ▼ Frames ▶ Frame (3) |
| 10 | HandHeld | 0x5F5F6F24AEBEED00 | Frames | ▼ Frames ▶ Frame (2) |

Inner table (under row 9):

| = id | = NumTimeSlots | = ActiveFlag | ◇ Links |
|---|---|---|---|
| 1 | 1600 | Active | ▶ Links |
| 2 | 6400 | Active | ▶ Links |
| 3 | 6400 | Active | Links |

650

CONFIGURING AND OPTIMIZING A WIRELESS MESH NETWORK

CROSS REFERENCE TO RELATED APPLICATION

This application claims the benefit of U.S. Provisional Patent App. No. 60/969,420 entitled "Configuring and Optimizing a Wireless Mesh Network," filed Aug. 31, 2007, the disclosure of which is hereby expressly incorporated herein by reference.

FIELD OF TECHNOLOGY

The present invention relates generally to managing wireless networks and, more particularly, to a method of configuring and optimizing a wireless mesh network by means of an interactive user interface and automated optimization routines.

BACKGROUND TECHNOLOGY

Communication protocols rely on various routing techniques to transfer data between communication endpoints on a communication network. Communication or network protocols and the corresponding routing strategies are typically selected in view of such factors as knowledge of network topology, size of the network, type of medium used as a signal carrier, security and reliability requirements, tolerable transmission delays, and types of devices forming the network. Due to a large number of such factors, a typical routing technique meets some of the design objectives at the expense of the others. For example, a certain routing technique may provide a high level of reliability in data delivery but may also require a relatively high overhead. Thus, while there are many known approaches to routing and many protocols compatible with these routing methods, there remain communication networks with the specific requirements that are not fully satisfied by any of the available routing methods and protocols. Moreover, as new types of communication networks, with the increasing demands for efficiency, throughput, and reliability, emerge in various industrial and commercial applications, the architects and developers frequently encounter new problems which are not easily addressed by the existing protocols and the associated routing techniques.

Generally speaking, a communication network includes nodes which are the senders and recipients of data and communication paths connecting the nodes. Additionally, communication networks typically include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium.

In order for a node to send data to another node on a typical network, either the complete path from the source to the destination or the immediately relevant part of the path must be known. For example, the World Wide Web (WWW) allows pairs of computer hosts to communicate over large distances without either host knowing the complete path prior to sending the information. Instead, hosts are configured with the information about their assigned gateways and dedicated routers. In particular, the Internet Protocol (IP) provides network layer connectivity to the WWW. IP defines a sub-protocol known as Address Resolution Protocol (ARP) which provides a local table at each host specifying the routing rules. Thus, a typical host connected to the WWW or a similar Wide Area Network (WAN) may know to route all packets with the predefined addresses matching a pre-configured pattern to host A and route the rest of the packets to host B. Similarly, the intermediate hosts forwarding the packets, or "hops," also execute partial routing decisions and typically direct data in the general direction of the destination.

Routing strategies on a typical network may be further complicated by scheduling issues. In general, scheduling refers to allocation of resources, such as timeslots on a wired or wireless link, to devices participating in communications on a network. Selecting a proper scheduling strategy and generating the optimal schedule for a particular network may be particularly relevant in a wireless environment. Because the number of available frequencies is typically limited, network hosts may not be able to transmit or receive data as soon as this data becomes available. For example, a pair of communicating devices, each capable of operating in receive and transmit modes, may exchange data over a single carrier frequency. In order to resolve potential collisions during transmissions and prevent the devices from missing data by failing to enter the receive mode at the right time, one could define a schedule assigning some transmission opportunities to the first device and the rest of the transmission opportunities to the second device. By complying with the schedule, the pair of devices could successfully maintain bidirectional data exchange over the same carrier frequency.

Unlike the example discussed above, most wireless networks include numerous devices and each device may have idiosyncratic requirements with respect to the amount of data the device needs to transmit, the rates of transmission and reception, the maximum amount of data the device is capable of receiving and transmitting per unit of time, the tolerable latency and potentially many other factors. Thus, scheduling decisions may become very complex and optimizing scheduling may become a high priority in many applications. Moreover, routing decisions and scheduling decisions may have a significant impact on each other and, as a result, may require an even more complicated simultaneous definition and optimization.

In short, there is a large number of factors influencing the implementation of particular protocols in particular industries. In the process control industry, it is known to use standardized communication protocols to enable devices made by different manufacturers to communicate with one another in an easy to use and easy to implement manner. One such well known communication standard used in the process control industry is the Highway Addressable Remote Transmitter (HART) Communication Foundation protocol, referred to generally as the HART protocol. Generally speaking, the HART protocol supports a combined digital and analog signal on a dedicated wire or set of wires, in which on-line process signals (such as control signals, sensor measurements, etc.) are provided as an analog current signal (e.g., ranging from 4 to 20 milliamps) and other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

There has been a move, in the past number of years, to incorporate wireless technology into various industries including, in some limited manners, the process control industry. However, there are significant hurdles in the process control industry that limit the full scale incorporation, acceptance and use of wireless technology, as the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236,334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

Similar to wired communications, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. Moreover, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In order to properly configure a wireless network, engineers and maintenance personnel must consider a large number of factors. In particular, engineers must evaluate at least the topology of the network and the capacity of network connections. Moreover, many applications in the process control industry, to take one example, require a degree of reliability, security, and efficiency which is significantly higher than the standards applied to most commercial or household applications. In order to meet these additional requirements, process control engineers must optimize both routing and scheduling in the wireless network. In other words, engineers must simultaneously pursue several design objectives, such as reducing latency, increasing reliability, and minimizing cost. Some of these objectives may not be compatible with each other at all times and the engineers may have to make difficult trade-off decisions. In cases when large plants have process control networks including many devices of different types, efficiently designing a wireless network may become even more time-consuming and challenging. Meanwhile, even minor mistakes in configuration may noticeably reduce the efficiency of a plant in which a wireless process control network is implemented and thus cause operators to incur significant financial losses.

Further, new facts or design considerations may become apparent only during the operation of a wireless network. For this reason, engineers may require a certain amount of testing prior to deployment. One or more tests may generate new data, parameters, and measurements which must then be incorporated into the existing design and, in particular, into the previously developed routes and schedules. Efficiently applying test data to an existing configuration without re-designing the entire network may become a challenging technical issue comparable to the difficulty of creating the original design.

Still further, network nodes may be added, removed, or repositioned in an existing wireless network, thereby rendering some of the routing and scheduling schemes ineffective or deficient. To continue with the example of the process control industry, a change in a network layout may require a new network configuration and a possible shutdown of a plant for the duration of configuration and testing.

SUMMARY

An interactive software tool for wireless network design allows a user to create a model of a wireless network, input several design requirements, and automatically generate routes and schedules for the network. The network design tool provides interactive graphic interface for the addition, removal, and positioning of nodes of the wireless network. Additionally, the network design tool provides a user menu including several interactive screens for specifying threshold values, network topology selections, routing preferences, and other configuration parameters related to generating routes and schedules. The network design tool automatically applies a set of optimization rules along with the parameters input by user to the network model in order to generate an efficient network schedule and identify routing paths, thereby optimizing the performance of the network. The network design tool is capable of displaying the generated schedules graphically, textually, or in an XML format. In one embodiment, the network design tool adjusts paths and schedules every time user makes changes to the network model or to the configuration parameters. The network design tool simulates the operation of the wireless network corresponding to the network model and provides feedback to the user in form of graphical indicators, text, and possibly sound.

In one aspect, the network design tool graphically depicts the network model using a set of predefined shapes and colors. In one embodiment, each network node is illustrated as a circle and each connection between a pair of nodes is illustrated as a line. In some embodiments, the lines include unidirectional or bidirectional arrows in order to indicate the direction of traffic in the simulated network. Additionally, the line color indicates whether the connection is potential or actual. In some embodiments, the circles representing network nodes additionally include symbols indicating a network device type and are colored according to the status of the network device. Several auxiliary symbols may provide such additional information as the energy source of a network device, signal attenuation at a particular location, and other facts helpful in viewing and operating a model of a wireless network.

In another aspect, the network design tool is communicatively coupled to the actual plant or automation network corresponding to the network model. The actual plant provides feedback to the network design tool in form of signal strength measurements, delay measurements, and other parameters useful in evaluating the performance of the network. The network design tool applies this live data to the network model and corrects, when necessary, the routing and scheduling decisions.

In yet another aspect, the optimization rules applied to the network model include such principles as minimizing the number of intermediate nodes, or "hops," between pairs of communicating devices, preferring routing through those devices which have a more reliable power source, and avoiding node overload. In another aspect, the optimization rules are ranked in importance for conflict resolution, with a higher ranking rule taking precedence over a lower ranking rule whenever the two rules are not compatible in application to a certain scheduling or routing decision. In another aspect, some of the optimization rules are directed to optimizing the power consumption of the wireless network and extending battery lives of battery-powered devices by routing data through devices with constant power sources whenever possible.

In another aspect, the network design tool accounts for the particulars of a wireless HART network and differentiates between such wireless HART network device types as gateway, network access point, router, and field device. The user may select the shapes or symbols corresponding to each wireless HART device type from the menu or from a toolbar provided as part of the user interface. Additionally, the network design tool allows the user to configure burst rates, or frequency of reporting process data to a Distributed Control System (DCS) or similar control unit, for each field device. Moreover, the network design tool automatically places one or more gateway devices at the head of a master graph corresponding to the collection of routing paths in the wireless network. The network design tool then defines, simulates, and adjusts routing of data both upstream and downstream with respect to head of the graph. In this aspect, the network design tool optimizes a wireless network for use in a process control environment supporting the wireless extension of the HART protocol.

DETAILED DESCRIPTION OF THE DRAWINGS

Figure 4:
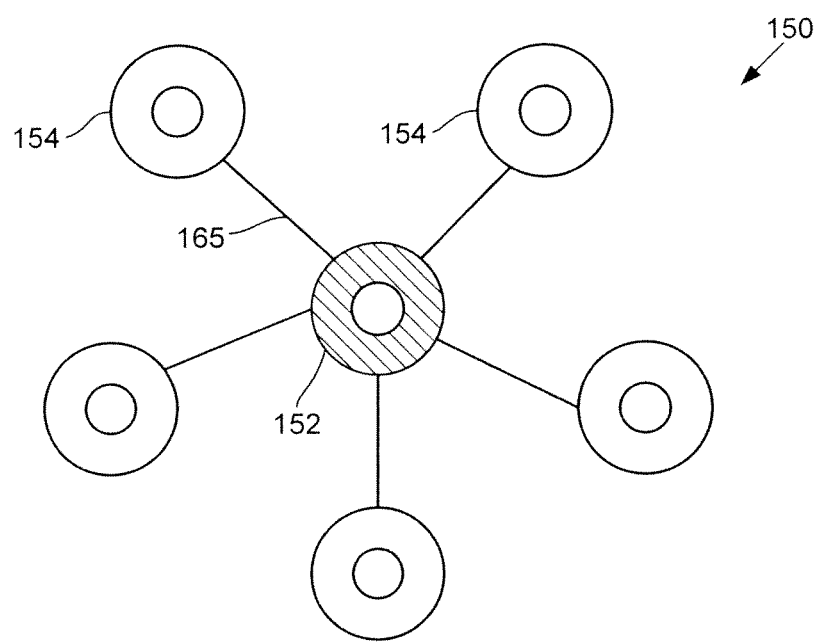

FIG. 4 schematically illustrates a star network topology.

Figure 5:
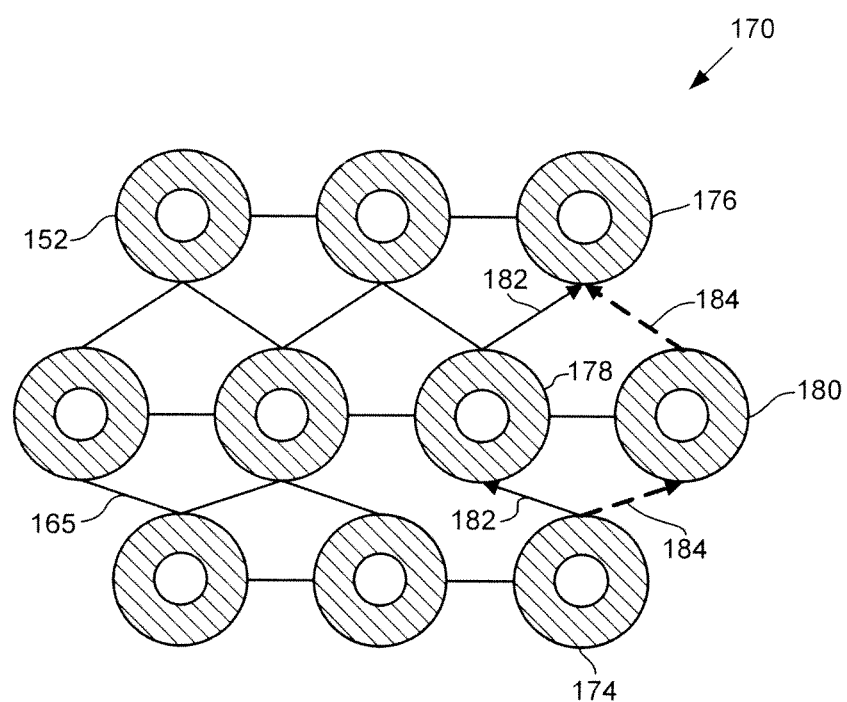

FIG. 5 schematically illustrates a mesh network topology.

Figure 6:
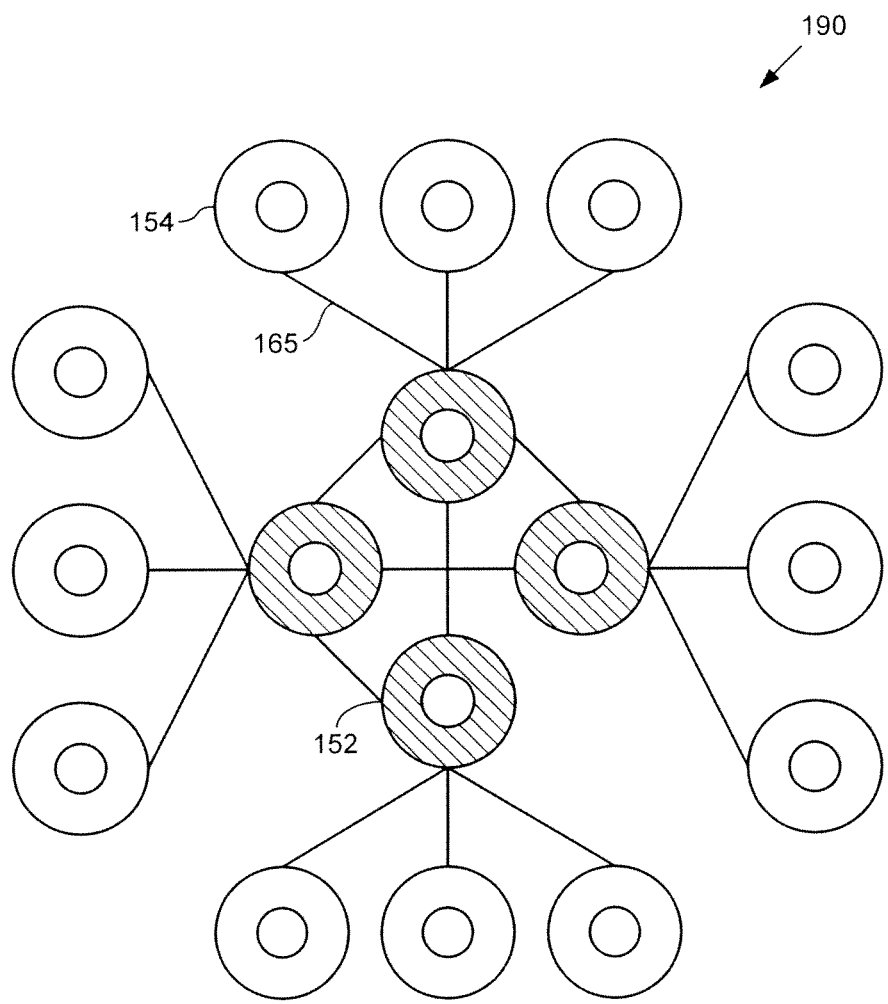

FIG. 6 schematically illustrates a star mesh network topology.

Figure 7:
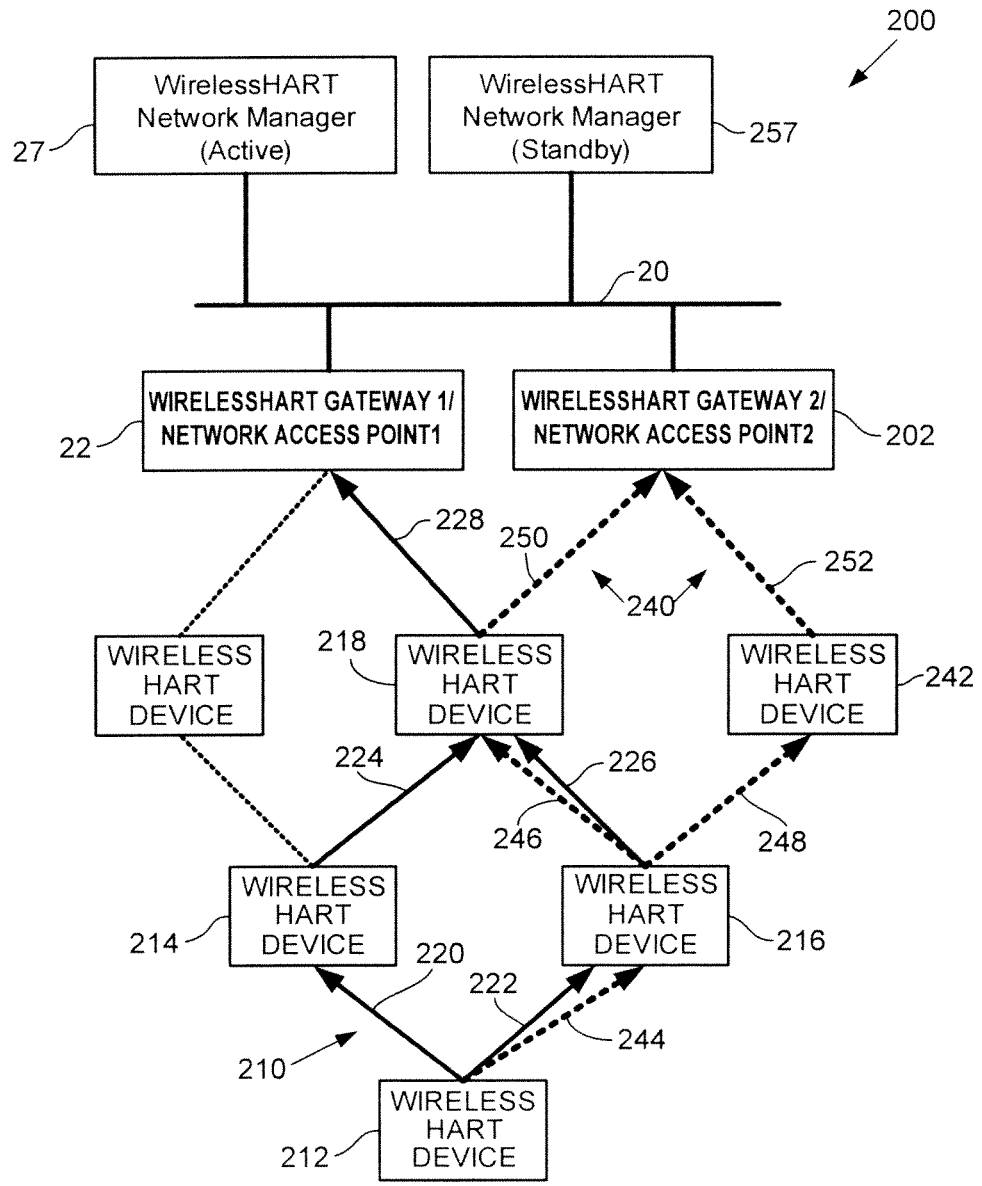

FIG. 7 is a block diagram illustrating path redundancy provided by a wireless HART protocol.

Figure 8:
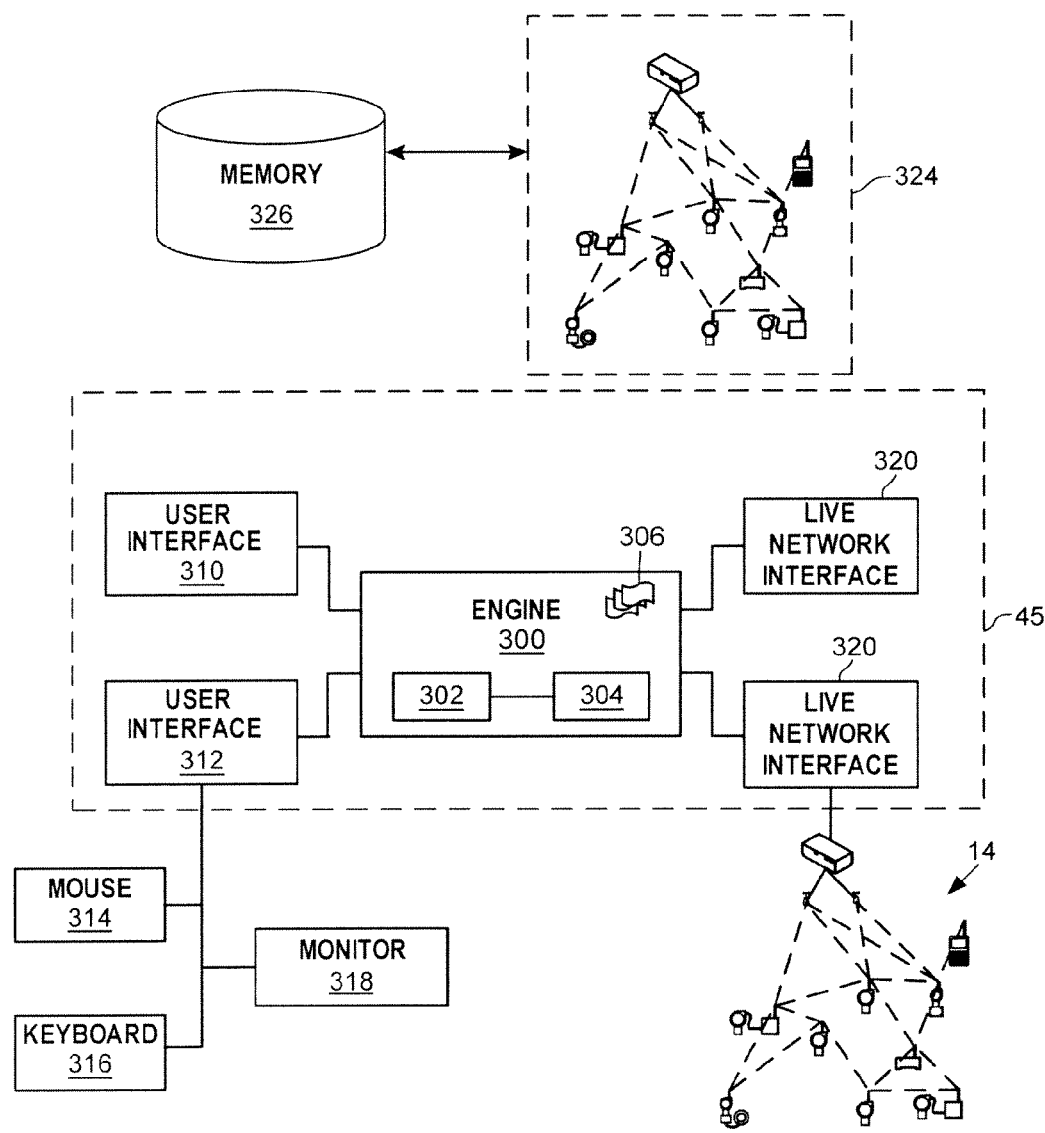

FIG. 8 is a block diagram schematically illustrating an exemplary software architecture of a network design tool to be used with a wireless communication network.

Figure 9:
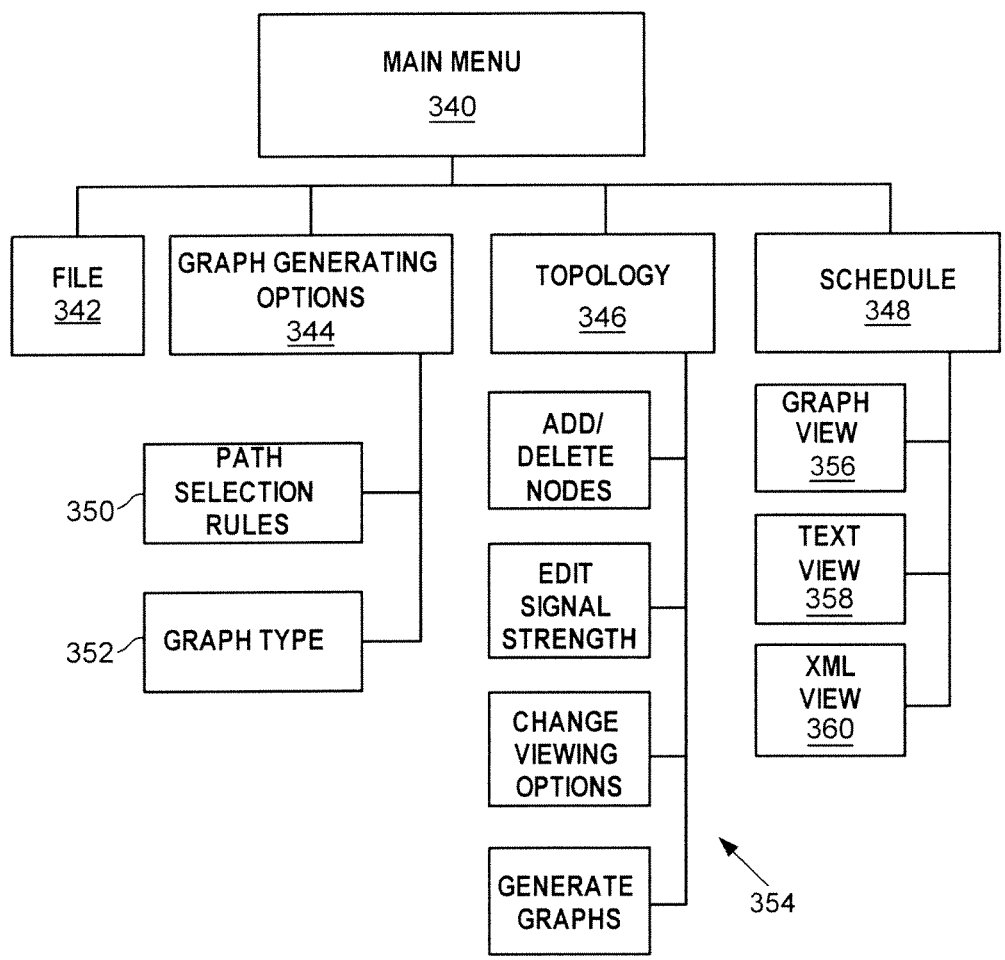

FIG. 9 is a block diagram illustrating an exemplary menu of a network design tool of FIG. 8.

Figure 10:
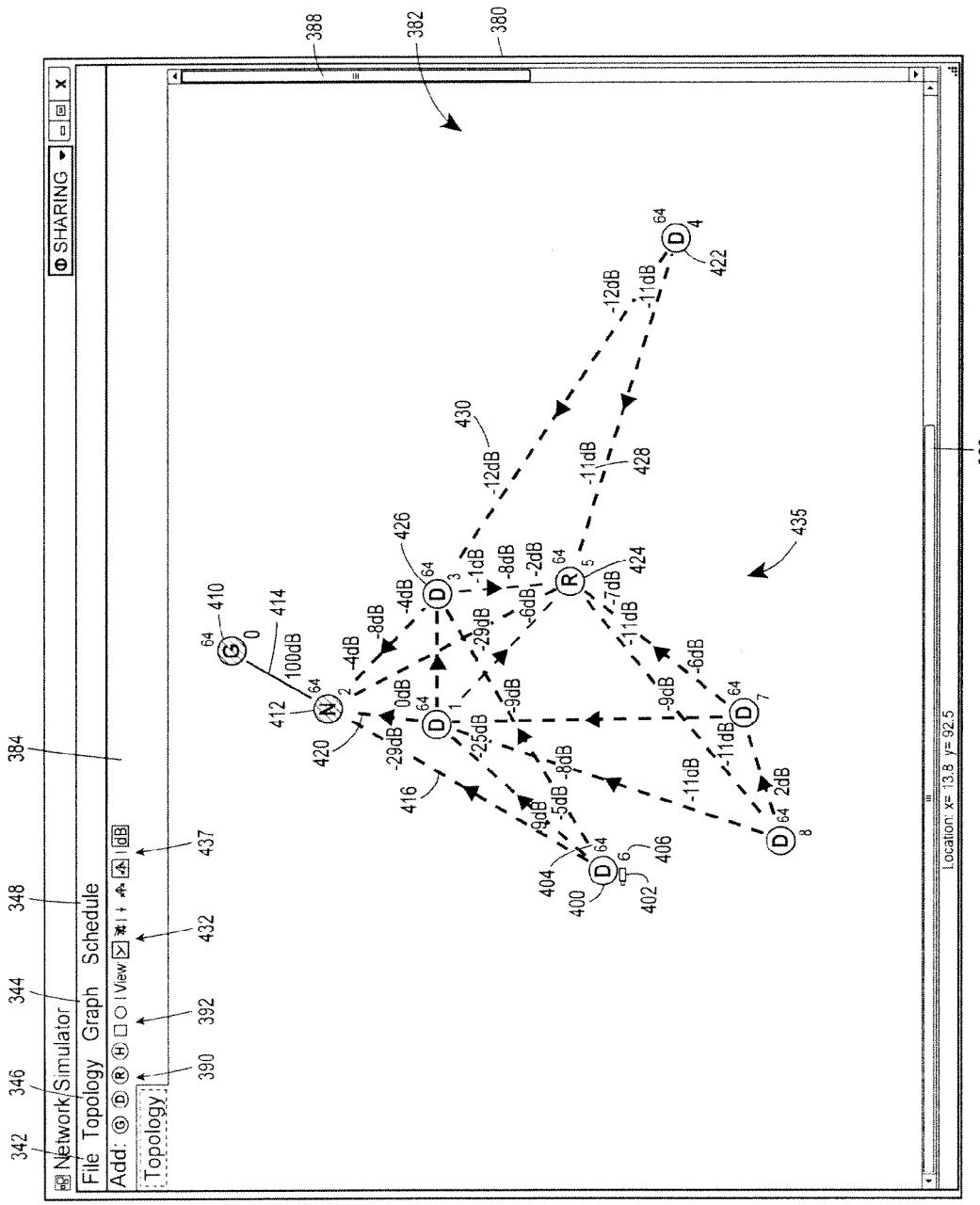

FIG. 10 is an exemplary screen of the network design tool illustrating creation of a network model.

Figure 11:
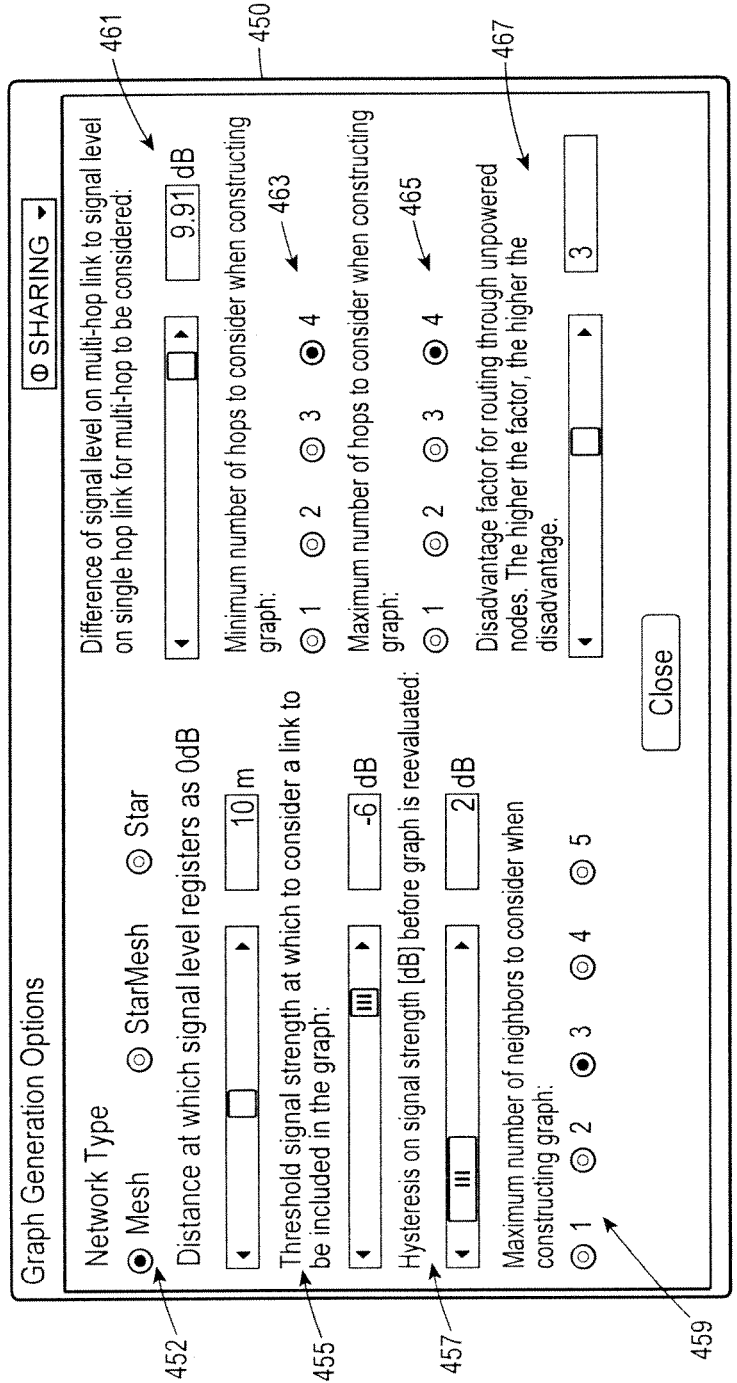

FIG. 11 is another exemplary screen of the network design tool illustrating rule and preference configuration for generating network graphs.

Figure 11A:
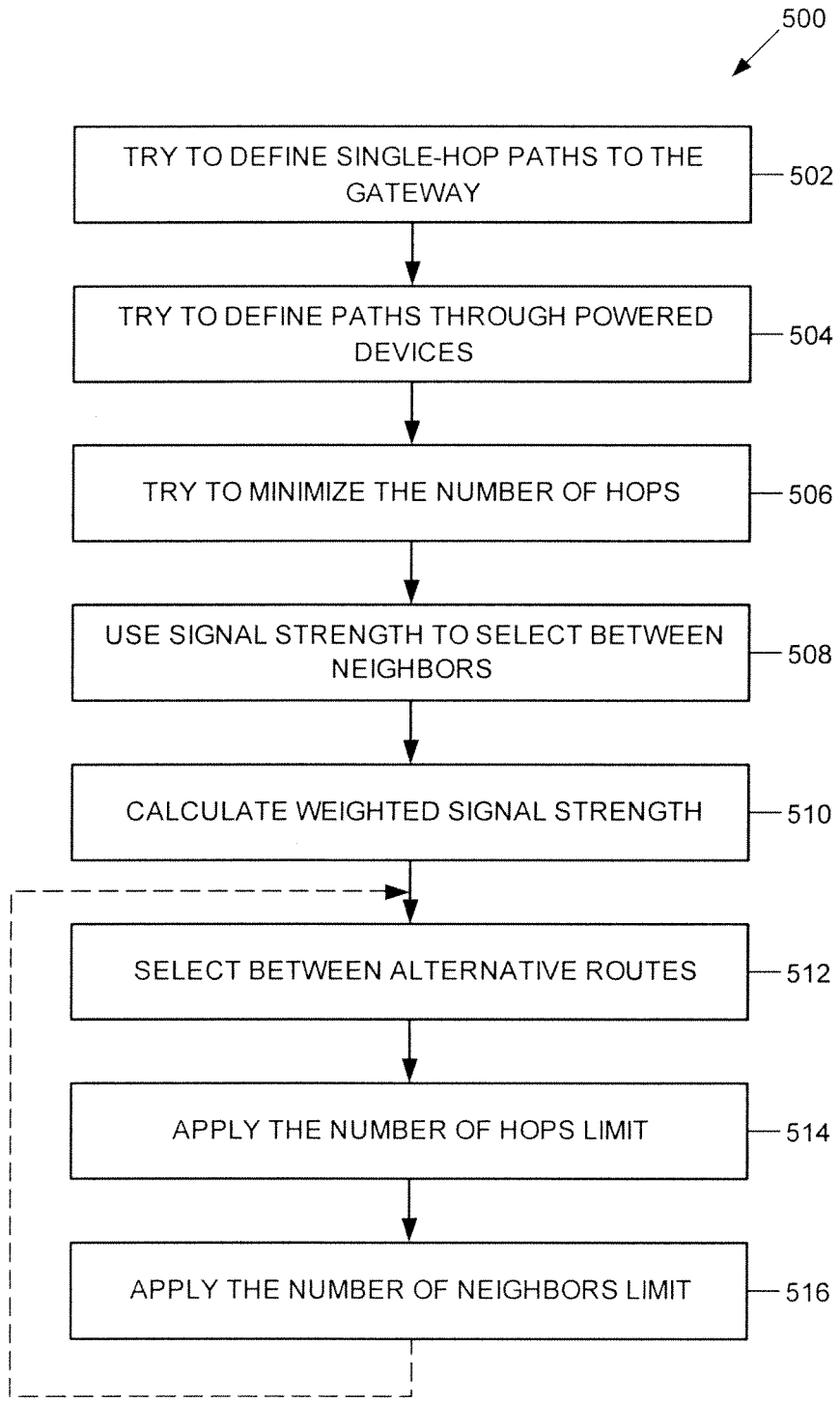

FIG. 11A illustrates a flow chart of a general exemplary algorithm which the network design tool may execute during automatic graph definition.

Figure 12:
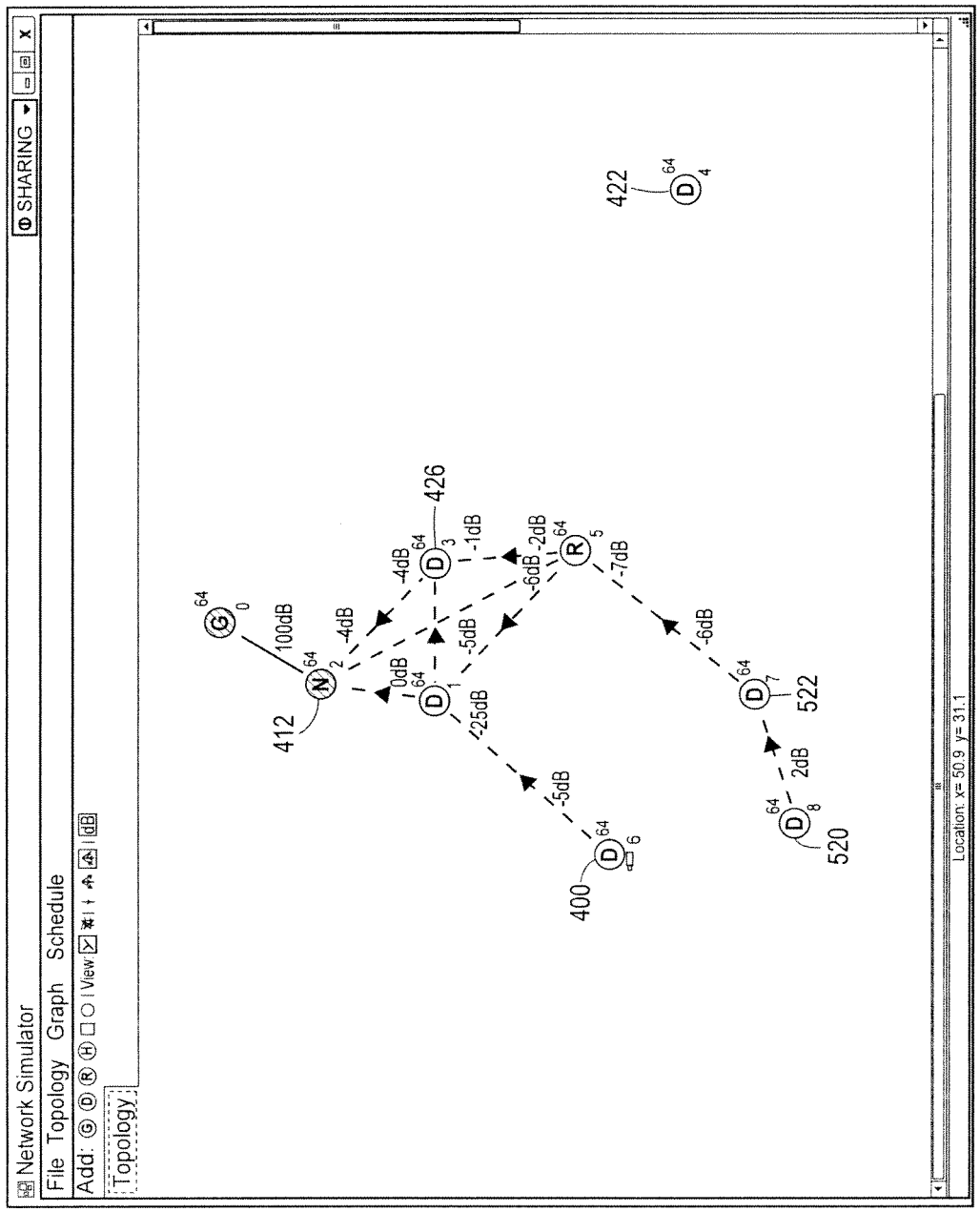

FIG. 12 is a screen of the network design tool illustrating an automatic update to the network graph triggered by a change in a threshold signal strength.

Figure 13:
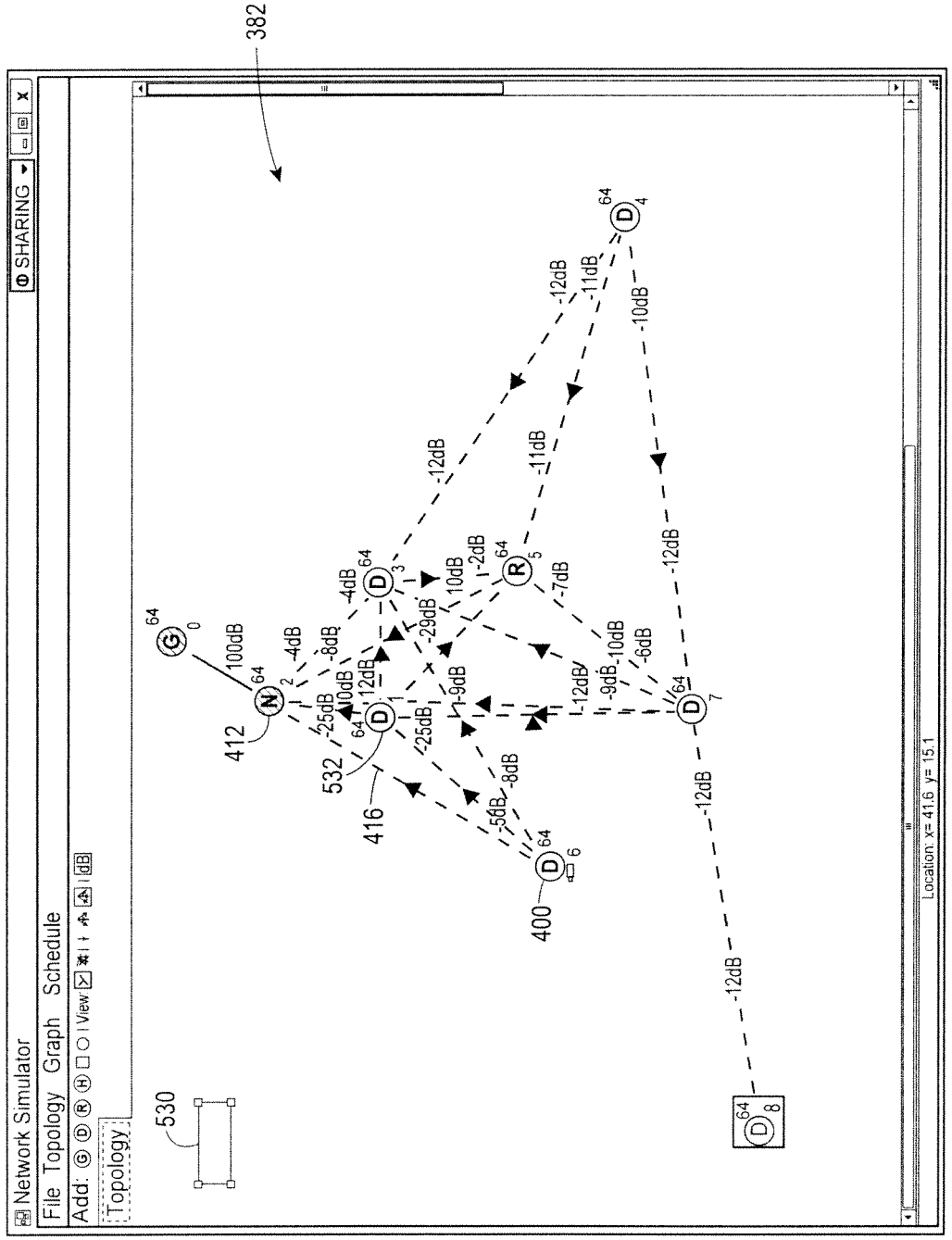

FIG. 13 is another exemplary screen of the network design tool illustrating obstacle simulation.

Figure 14:
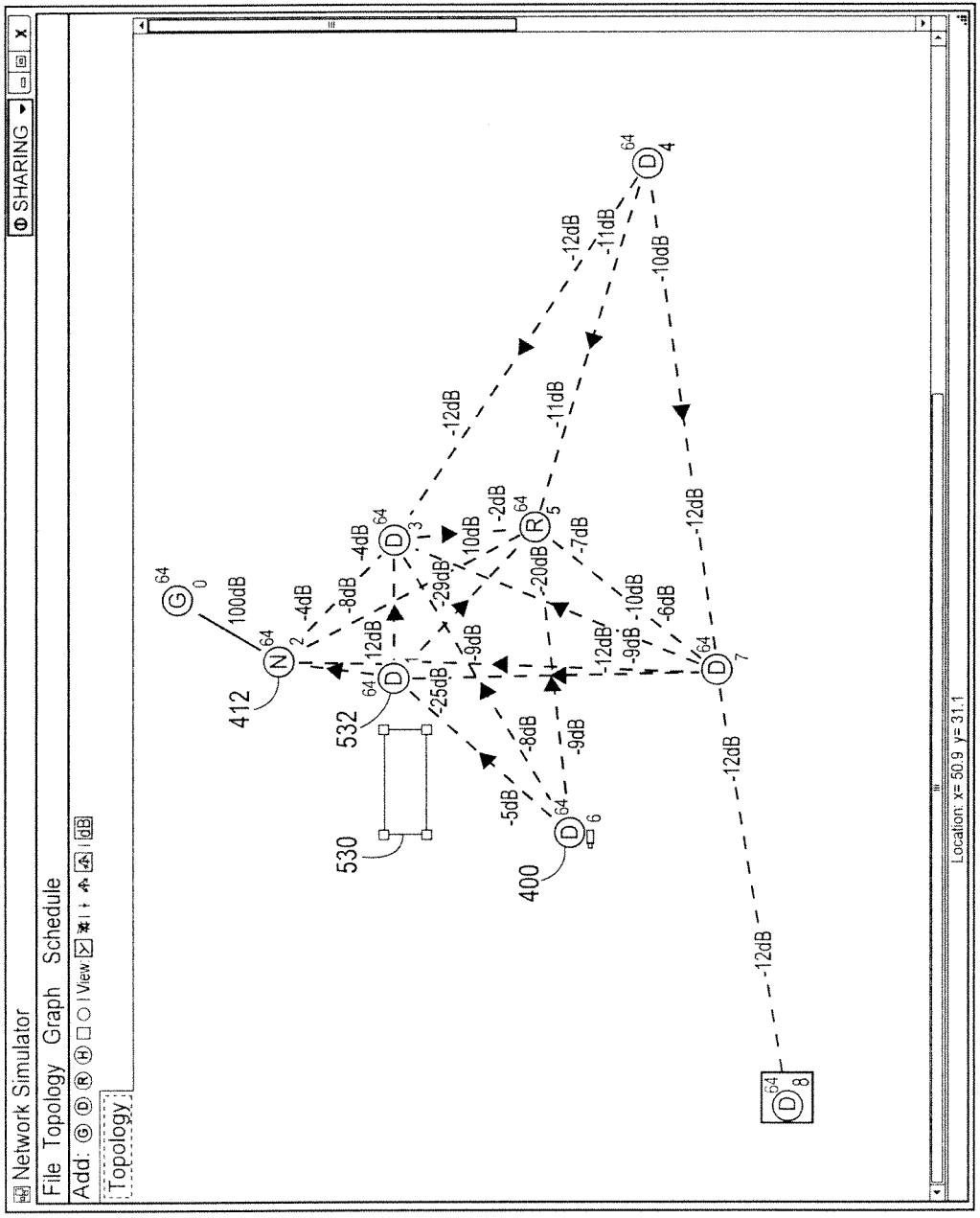

FIG. 14 is a screen of the network design tool illustrating an automatic update to the network graph triggered by a change in the location of the obstacle.

Figure 14A:
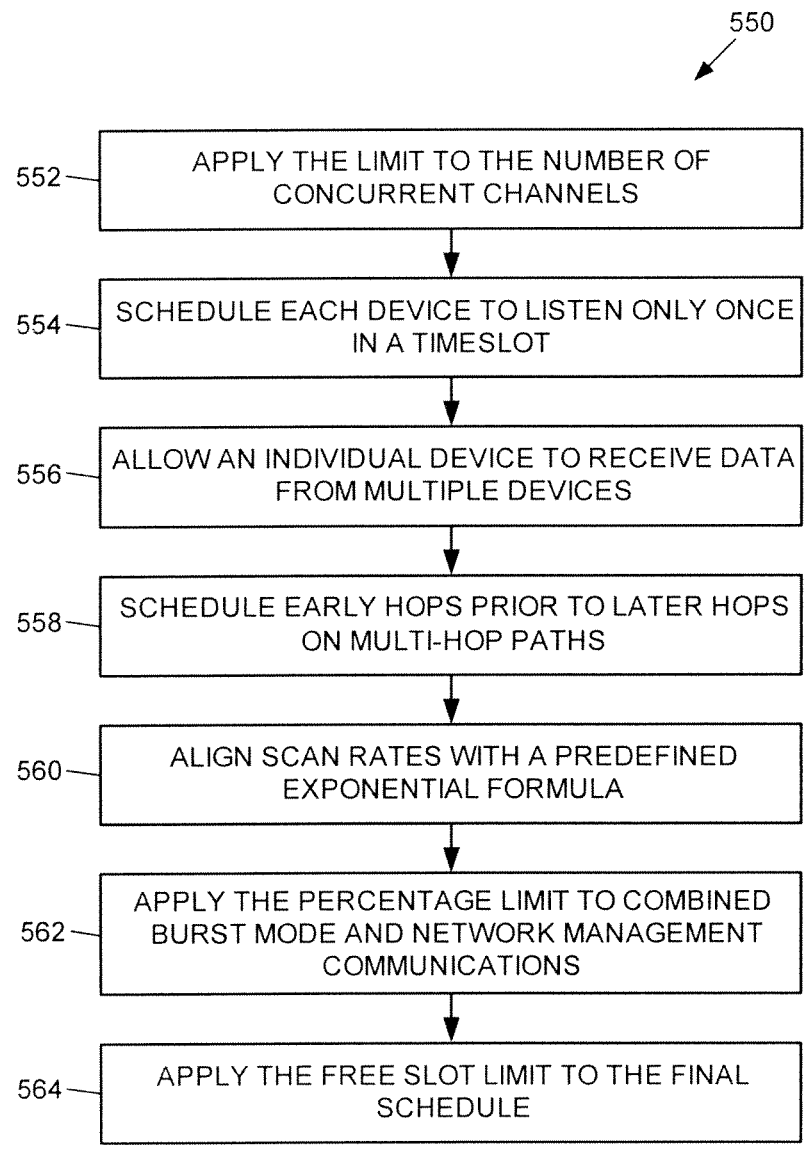

FIG. 14A illustrates an exemplary scheduling procedure responsible for design constraint enforcement which may be executed by the network design tool.

Figure 14B:
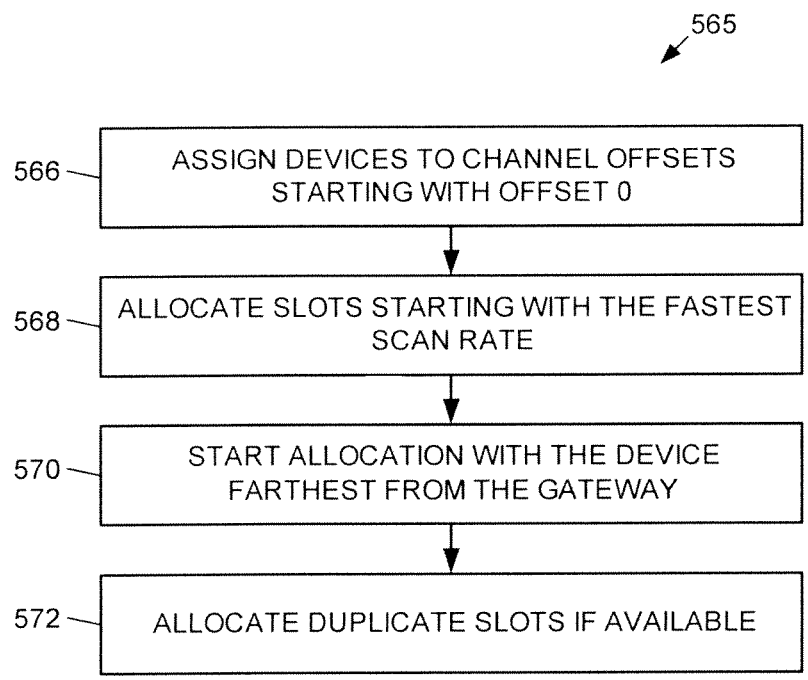

FIG. 14B illustrates an exemplary scheduling procedure responsible for data superframe configuration which may be executed by the network design tool.

Figure 14C:
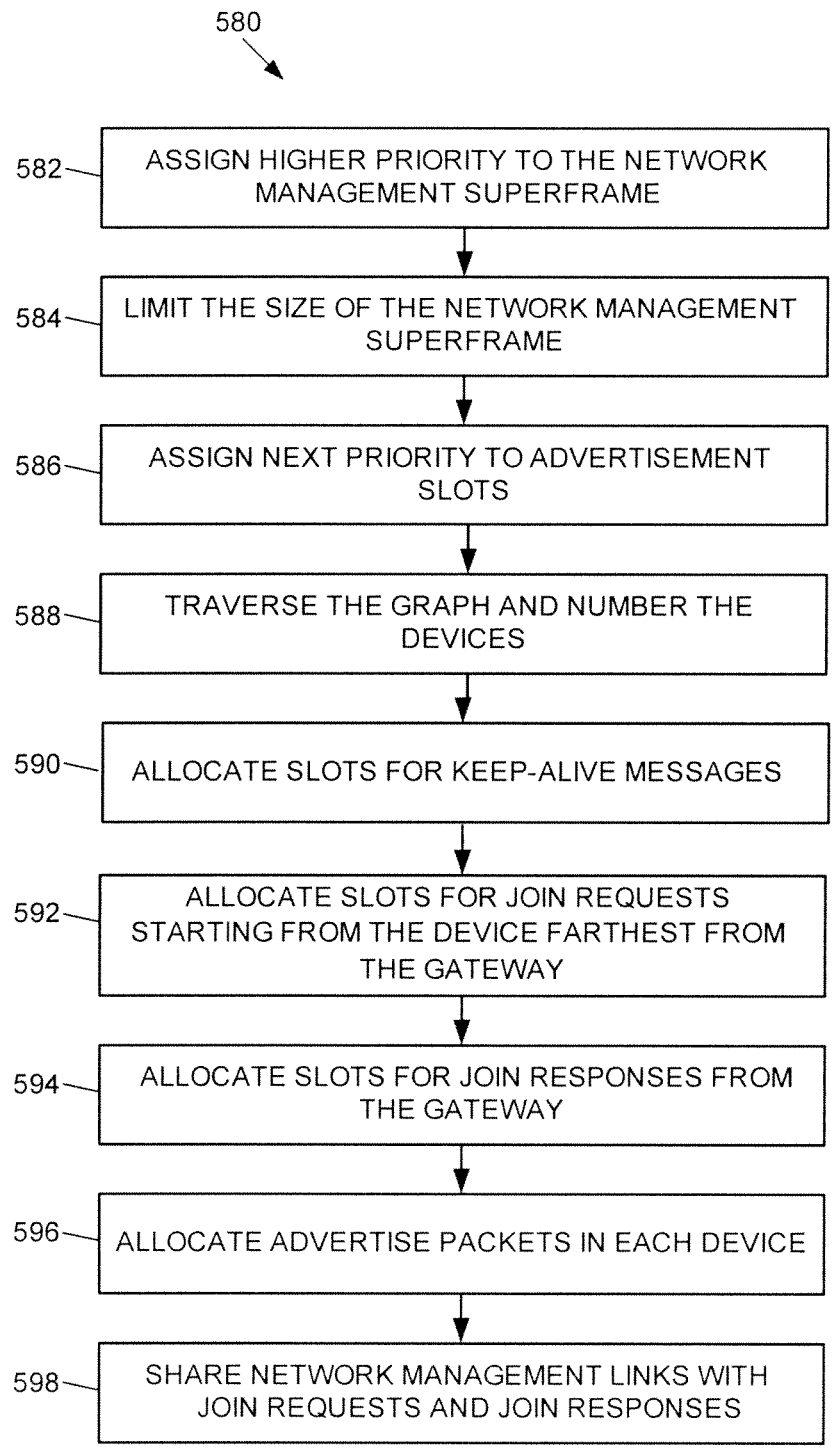

FIG. 14C illustrates an exemplary scheduling procedure responsible for management superframe configuration which may be executed by the network design tool.

Figure 15:
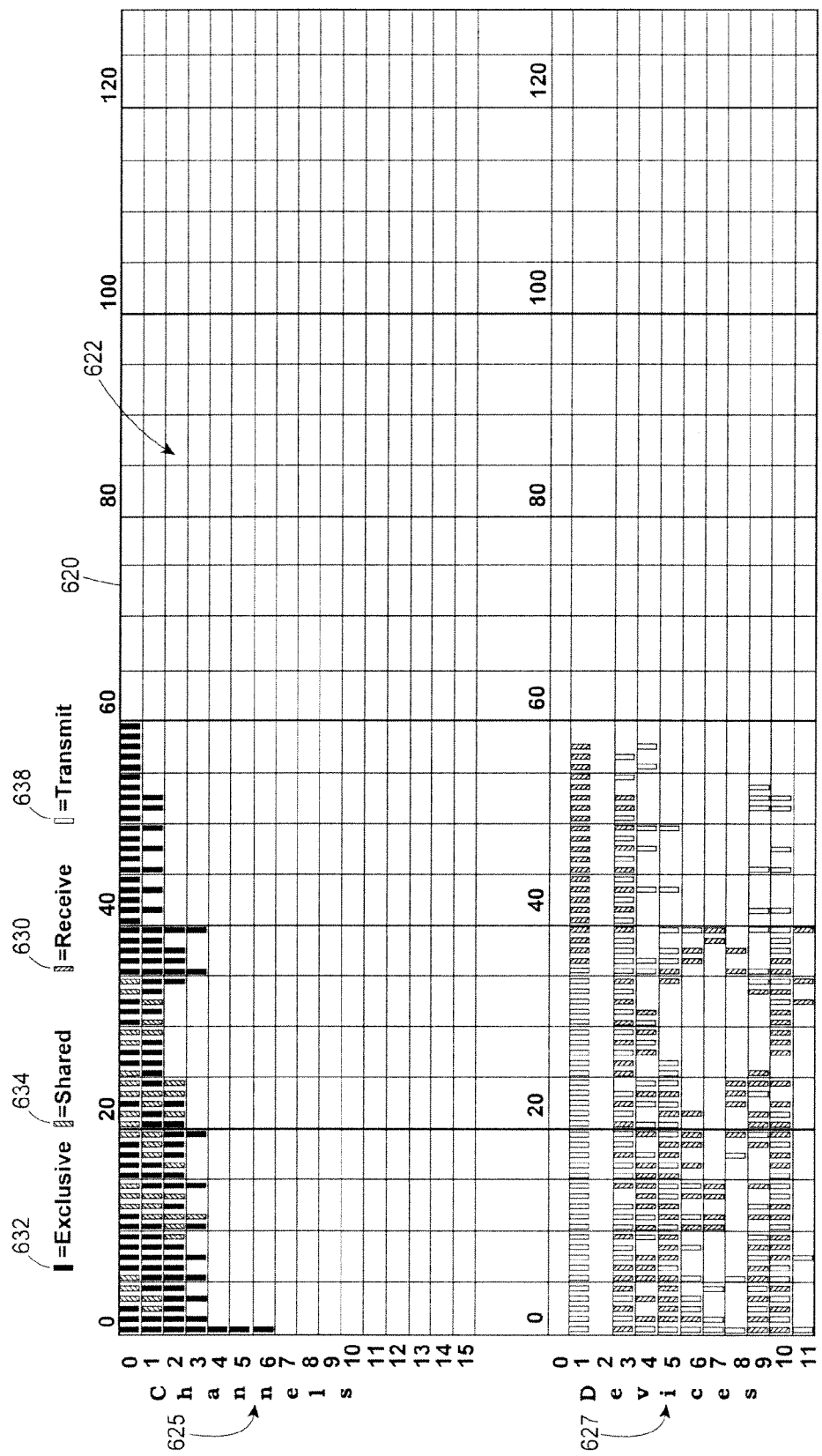

FIG. 15 is an exemplary screen of the network design tool graphically illustrating time slot allocation, assignment, and other scheduling parameters.

FIG. 16A is an exemplary screen of the network design tool textually specifying time slot allocation, assignment, and other scheduling parameters.

Figure 16B:
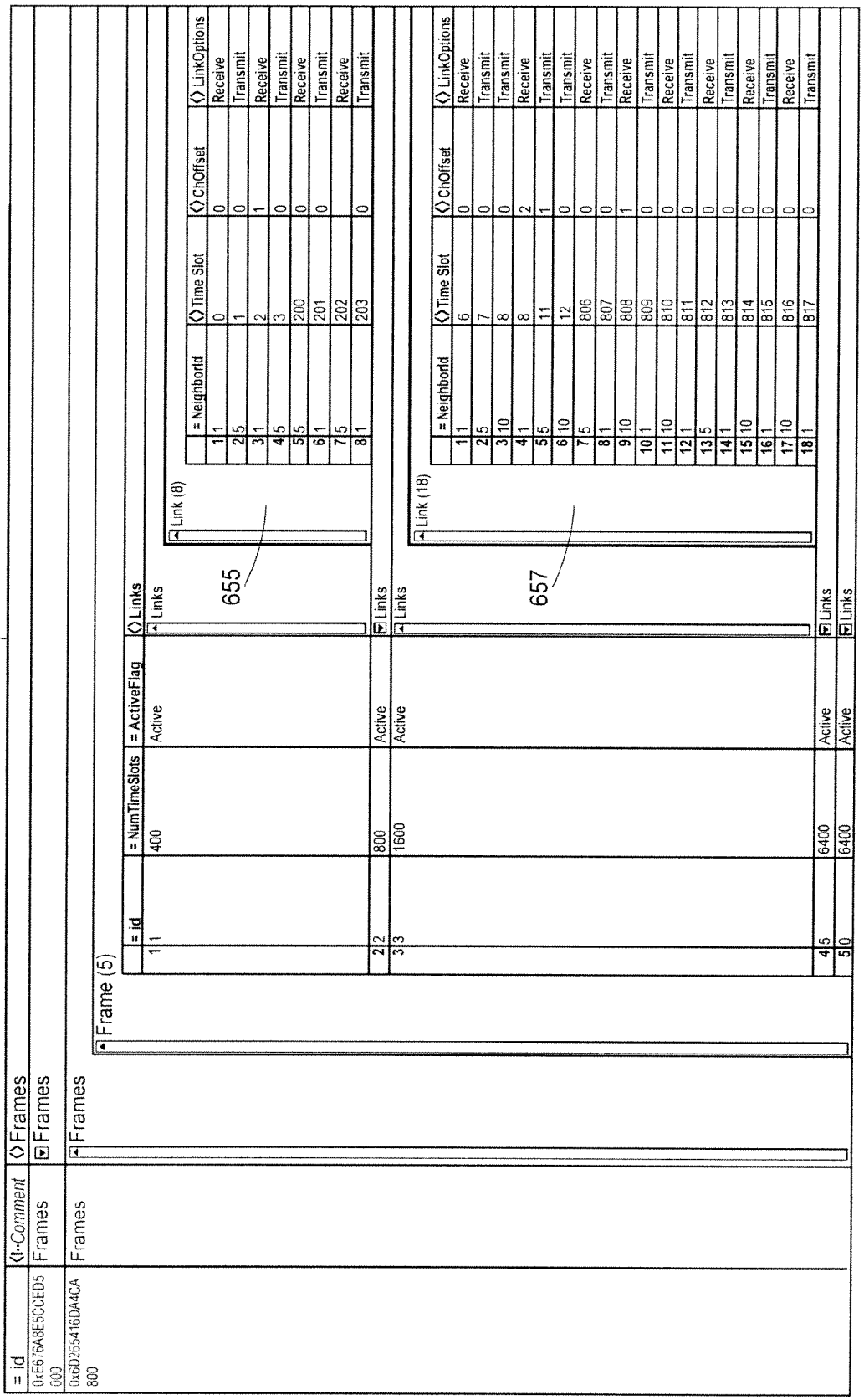

FIG. 16B is another exemplary screen of the network design tool displaying an expanded view of several parameters of one of the devices listed in the exemplary screen of FIG. 16A.

Figure 17:
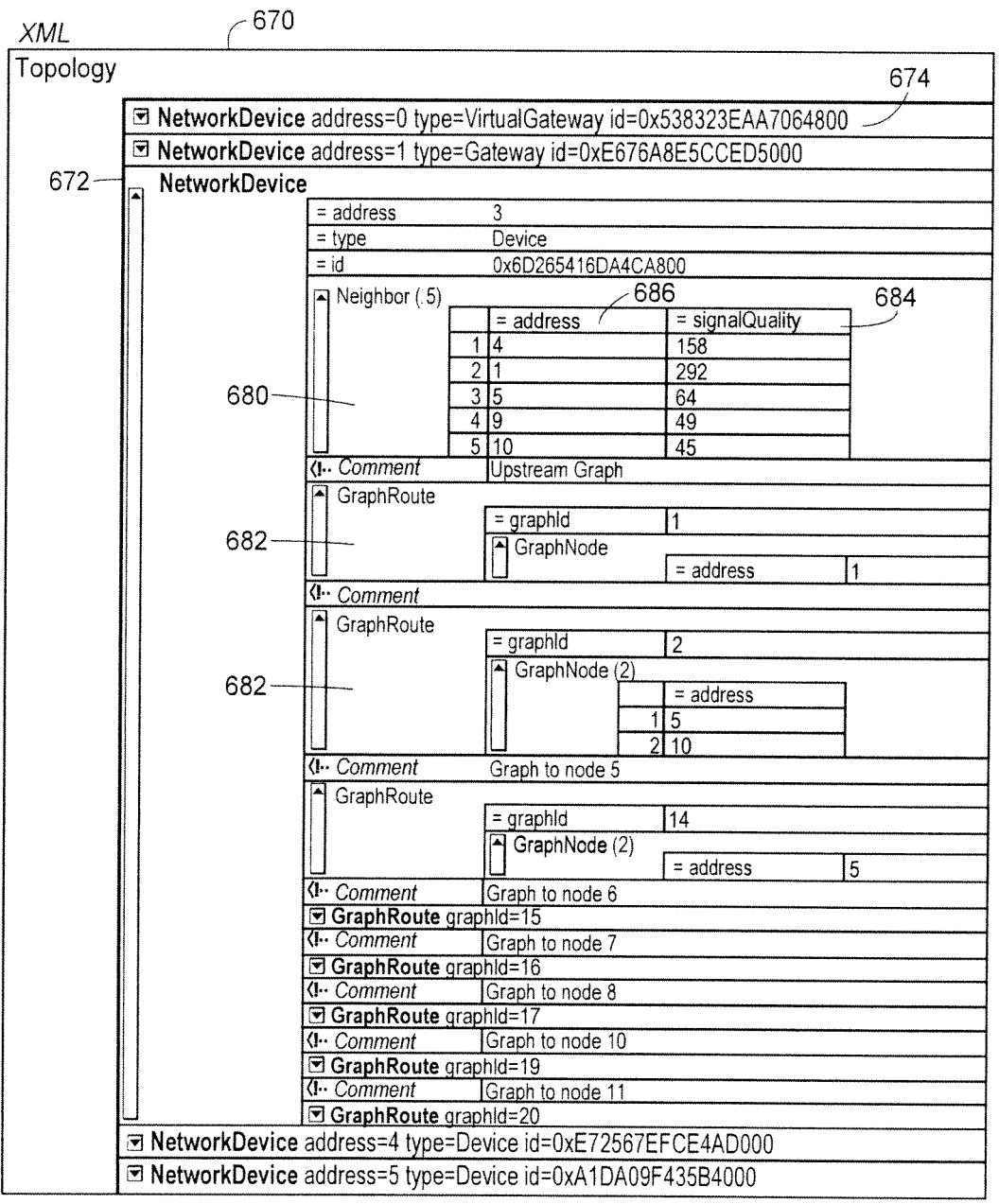

FIG. 17 an exemplary screen of the network design tool textually specifying graph routing parameters.

DETAILED DESCRIPTION

Figure 1:
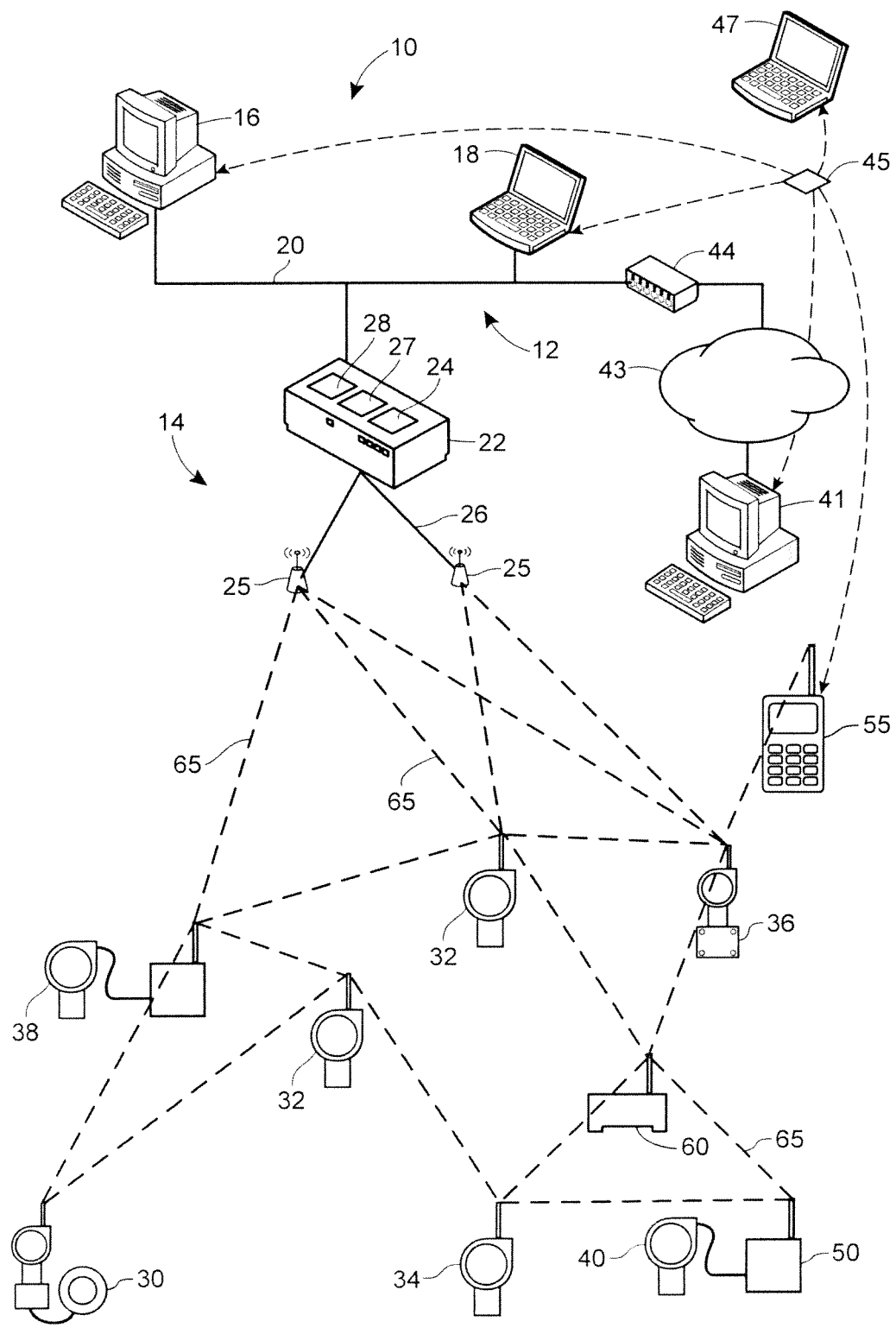
FIG. 1 is a block diagram that illustrates a system utilizing a wireless HART network to provide wireless communication between field and router devices, which are connected to a plant automation network via a gateway device.

FIG. 1 illustrates an exemplary network 10 to which a network design tool described herein may be applied or with which the network design and optimization tool may be used. In particular, the network 10 may include a plant automation network 12 and a wireless HART network 14. The plant automation network 12 may include one or more stationary workstations 16 and one or more portable workstations 18 connected over a communication backbone 20. The backbone 20 may be implemented over Ethernet, RS-485, Profibus DP or other suitable communication protocol. The plant automation network 12 and the wireless HART network 14 may be connected via a gateway 22. Specifically, the gateway 22 may be connected to the backbone 20 in a wired manner and may communicate with the plant automation network 12 by using any suitable known protocol. The gateway 22 may be implemented as a stand-alone device, as a card insertable into an expansion slot of the hosts or workstations 16 or 18, or as part of the IO subsystem of a PLC-based or DCS-based system, or in any other manner. The gateway 22 provides applications running on the network 12 access to various devices of the wireless HART network 14. In addition to protocol and command conversion, the gateway 22 may provide synchronized clocking used by time slots and superframes (sets of communication time slots spaced equally in time) of the scheduling scheme of the wireless HART network 14.

In some situations, networks may have more than one gateway 22. These multiple gateways can be used to improve the effective throughput and reliability of the network by providing additional bandwidth for the communication between the wireless HART network and the plant automation network 12 or the outside world. On the other hand, the gateway 22 device may request bandwidth from the appropriate network service according to the gateway communication needs within the wireless HART network. The gateway 22 may further reassess the necessary bandwidth while the system is operational. For example, the gateway 22 may receive a request from a host residing outside the wireless HART network 14 to retrieve a large amount of data. The gateway device 22 may then request additional bandwidth from a dedicated service such as a network manager in order to accommodate this transaction. The gateway 22 may then request the release of the unnecessary bandwidth upon completion of the transaction.

In some embodiments, the gateway 22 is functionally divided into a virtual gateway 24 and one or more network access points 25. Network access points 25 may be separate physical devices in wired communication with the gateway 22 in order to increase the bandwidth and the overall reliability of the wireless HART network 14. However, while FIG. 1 illustrates a wired connection 26 between the physically separate gateway 22 and access points 25, it will be understood that the elements 22-26 may also be provided as an integral device. Because network access points 25 may be physically separate from the gateway device 22, the access points 25 may be strategically placed in several distinct locations. In addition to increasing the bandwidth, multiple access points 25 can increase the overall reliability of the network by compensating for a potentially poor signal quality at one access point at one or more other access points. Having multiple access points 25 also provides redundancy in case of failure at one or more of the access points 25.

The gateway device 22 may additionally contain a network manager software module 27 and a security manager software module 28. In another embodiment, the network manager 27 and/or the security manager 28 may run on one of the hosts on the plant automation network 12. For example, the network manager 27 may run on the host 16 and the security manager 28 may run on the host 18. The network manager 27 may be responsible for configuration of the network, scheduling communication between wireless HART devices (i.e., configuring superframes), management of the routing tables and monitoring and reporting the health of the wireless HART network 14. While redundant network managers 27 are supported, it is contemplated that there should be only one active network manager 27 per wireless HART network 14.

Referring again to FIG. 1, the wireless HART network 14 may include one or more field devices 30-40. In general, process control systems, like those used in chemical, petroleum or other process plants, include such field devices as valves, valve positioners, switches, sensors (e.g., temperature, pressure and flow rate sensors), pumps, fans, etc. Field devices perform control functions within the process such as opening or closing valves and taking measurements of process parameters. In the wireless HART communication network 14, field devices 30-40 are producers and consumers of wireless HART packets.

An external host 41 may be connected to a network 43 which, in turn, may be connected to the plant automation network 12 via a router 44. The network 43 may be, for example, the World Wide Web (WWW). Although the external host 41 does not belong to either the plant automation network 12 or the wireless HART network 14, the external host 41 may access devices on both networks via the router 44. A network design tool 45 may reside and run on the external host 41 and provide the wireless network configuration and simulation functionality discussed in greater detail below. Alternatively, the network design tool 45 may run on the stationary workstation 16, on the portable workstation 18, or on a portable device connected directly to the wireless HART network 14. In some embodiments, the network design tool 45 may run in a distributed manner on several hosts of the network 10. In yet another embodiment, the network design tool 45 may run on a standalone host 47 and therefore have no access or only periodic access to either the network 12 or the network 14. In this case, the feedback information related to the performance of the wireless network 14 may be entered manually into the network design tool 45 by means of the host 47.

The network design tool 45 may be implemented as a software package using one or more programming languages such as C/C++ or JAVA, or for example. The software of the network design tool 45 may be stored on one or several hosts 16, 18, 41, or 47 in a conventional manner. Alternatively, the network design tool 45 may be provided on a portable memory disk such as a CD or DVD and may be loaded into the volatile memory of a computer host during operation. For example, some or all of the hosts 16, 18, 41, and 47 may include hard drives and flash drives capable of permanently storing software and CD and DVD drives compatible with a CD or DVD containing the network design tool 45. In another embodiment, the network design tool 45 may be provided as a distributed web service, or a software running remotely and accessible via the internet or intranet. For example, the remote host 41 may contain some of the software components of the network design tool 45 while the workstation 16 may provide user interface to operators via a keyboard, a mouse, a computer screen, and similar input/output devices. In accordance with this embodiment, operators may access and benefit from some or all of the features of the network design tool 45 but the software of the network design tool 45 may reside remotely for security or copyright reasons.

The wireless HART network 14 may use a protocol which provides similar operational performance that is experienced with wired HART devices. The applications of this protocol may include process data monitoring, critical data monitoring (with the more stringent performance requirements), calibration, device status and diagnostic monitoring, field device troubleshooting, commissioning, and supervisory process control. These applications require that the wireless HART network 14 use a protocol which can provide fast updates when necessary, move large amounts of data when required, and support network devices which join the wireless HART network 14 only temporarily for commissioning and maintenance work.

In one embodiment, the wireless protocol supporting network devices of the wireless HART network 14 is an extension of HART, a widely accepted industry standard, that maintains the simple workflow and practices of the wired environment. In accordance with this embodiment, the same tools used for wired HART devices may be easily adapted to wireless devices with the simple addition of new device description files. In this manner, the wireless HART protocol leverages the experience and knowledge gained using HART to minimize training and simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, developing and supporting devices that may be used with such networks. Some of the additional benefits of a wireless extension of HART include: access to measurements that were difficult or expensive to get to with wired devices, ability to configure and operate instruments from system software that can be installed on laptops, handhelds, workstations, etc. Another benefit is the ability to send diagnostic alerts from wireless devices back through the various communication techniques to a centrally located diagnostic center. For example, every heat exchanger could be fitted with a wireless HART device and the end user and supplier alerted when the heat exchanger detects a problem. Yet another benefit is the ability to monitor conditions that present serious health and safety problems. For example, a wireless HART device could be placed in flood zones on roads and used to alert authorities and drivers about water levels. Other benefits include access to wide range of diagnostics alerts and the ability to store trended as well as calculated values at the wireless HART device so that when communications to the device are established the values can be transferred to the host. Thus, a wireless HART protocol can provide technology for host applications to have wireless access to existing HART-enabled field devices and will support the deployment of battery operated, wireless only HART-enabled field devices. The wireless HART protocol may be used to establish a wireless communication standard for process applications and may further extend the application of HART communications and the benefits it provides to industry by enhancing the HART technology to support wireless process automation applications.

Referring again to FIG. 1, field devices 30-36 may be wireless HART devices. In other words, a field device 30, 32, 34, or 36 may be provided as an integral unit supporting all layers of the wireless HART protocol stack. In the network 10, the field device 30 may be a wireless HART flow meter, the field devices 32 may be wireless HART pressure sensors, the field device 34 may be a wireless HART valve positioner, and the field device 36 may a wireless HART pressure sensor. Importantly, wireless HART devices 30-36 are HART devices supporting all that users have come to expect from the wired HART protocol. As one of ordinary skill in the art will appreciate, one of the core strengths of the HART protocol is its rigorous interoperability requirements. In some embodiments, all wireless HART equipment includes core mandatory capabilities in order to allow equivalent device types to be exchanged without compromising system operation. Furthermore, the wireless HART protocol is backward compatible to HART core technology such as the device description language (DDL). In the preferred embodiment, all HART devices should support the DDL, which ensures that end users immediately have the tools to begin utilizing the wireless HART protocol.

On the other hand, a field device 38 may be a legacy 4-20 mA device and a field device 40 may be a wired HART device. Field devices 38 and 40 may be connected to the wireless HART network 13 via a wireless HART adaptor (WHA) 50. Additionally, the WHA 50 may support other communication protocols such as Foundation Fieldbus, PROFIBUS, DevicesNet, etc. In these embodiments, the WHA 50 supports protocol translation on a lower layer of the protocol stack. Additionally, it is contemplated that a single WHA 50 may also function as a multiplexer and support multiple HART or non-HART devices.

Plant personnel may additionally use handheld devices for installation, control, monitoring, and maintenance of network devices. Generally speaking, handheld devices are portable equipment that can connect directly to the wireless HART network 14 or through the gateway 22 as a host on the plant automation network 12. As illustrated in FIG. 1, a wireless HART-connected handheld device 55 communicates directly to the wireless HART network 14. When operating with a formed wireless HART network 14, this device may join the network 14 as just another wireless HART field device. When operating with a target network device that is not connected to a wireless HART network, the handheld device 55 may operate as a combination of the gateway device 22 and the network manager 27 by forming its own wireless HART network with the target network device.

A plant automation network-connected handheld device (not shown) connects to the plant automation network 12 through known networking technology, such as Wi-Fi. This device talks to the network devices 30-40 through the gateway device 22 in the same fashion as external plant automation servers (not shown) or the workstations 16 and 18.

Additionally, the wireless HART network 14 may include a router device 60. The router device 60 is a network device that forwards packets from one network device to another. A network device that is acting as a router device uses internal routing tables to decide to which network device it should forward a particular packet. Stand alone routers such as the router 60 may not be required in those embodiments where all devices on the wireless HART network 14 support routing. However, it may be beneficial (e.g. to extend the network, or to save the power of a field device in the network) to add a dedicated router 60 to the network.

All devices directly connected to the wireless HART network 14 may be referred to as network devices. In particular, the wireless HART field devices 30-36, the adaptors 50, the routers 60, the gateway 22, the access points 25, and the wireless HART-connected handheld device 55 are, for the purposes of routing and scheduling, the network devices or the nodes of the wireless HART network 14. In order to provide a very robust and an easily expandable network, it is contemplated that all network devices may support routing and each network device may be globally identified by its HART address. The network manager 27 may contain a complete list of network devices and assign each device a short, network unique 16-bit nickname. Additionally, each network device may store information related to update rates, connections sessions, and device resources. In short, each network device maintains up-to-date information related to routing and scheduling. The network manager 27 communicates this information to network devices whenever new devices join the network or whenever the network manager detects or originates a change in topology or scheduling of the wireless HART network 14.

Further, each network device may store and maintain a list of neighbor devices that the network device has identified during the listening operations. Generally speaking, a neighbor of a network device is another network device of any type potentially capable of establishing a connection with the network device in accordance with the standards imposed by a corresponding network. In case of the wireless HART network 14, the connection is a wireless connection. However, it will be appreciated that a neighboring device may also be a network device connected to the particular device in a wired manner. As will be discussed later, network devices promote their discovery by other network devices through advertisement, or special messages sent out during the designated timeslots. Network devices operatively connected to the wireless HART network 14 have one or more neighbors which they may choose according to the strength of the advertising signal or to some other principle. Referring again to FIG. 1, in a pair of network devices connected by a direct wireless connection 65, each device recognizes the other as a neighbor. Thus, network devices of the wireless HART network 14 may form a large number of connections 65. The possibility and desirability of establishing a direct wireless connection 65 between two network devices is determined by several factors such as the physical distance between the nodes, obstacles between the nodes, signal strength at each of the two nodes, etc. Further, two or more direct wireless connections 65 may form paths between nodes that cannot form a direct wireless connection 65. For example, the direct wireless connection 65 between the wireless HART hand-held device 55 and wireless HART device 36 along with the second direct wireless connection 65 between the wireless HART device 36 the router 60 form a communication path between devices 55 and 60.

Each wireless connection 65 is characterized by a large set of parameters related to the frequency of transmission, the method of access to the radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (2.4 GHz). While the system and method discussed herein may be applied to a wireless network operating on any designated frequency or range of frequencies, the embodiment discussed below relates to the wireless HART network 14 operating in the unlicensed, or shared part of the radio spectrum. In accordance with this embodiment, the wireless HART network 14 may be easily activated and adjusted to operate in a particular unlicensed frequency range as needed.

For a wireless network protocol using an unlicensed frequency band, coexistence is a core requirement because a wide variety of communication equipment and interference sources may be present. Thus, in order to successfully communicate, devices using a wireless protocol must coexist with other equipment utilizing this band. Coexistence generally defines the ability of one system to perform a task in a given shared environment in which other systems have an ability to perform their tasks, wherein the various systems may or may not be using the same set of rules. One requirement of coexistence in a wireless environment is the ability of the protocol to maintain communication while there is interference present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the system may ask what impact the transmitted signal of one transmitter has on other radio systems operating in proximity to the system. More specifically, the operator may ask whether the transmitter disrupts communication of some other wireless device every time the transmitter turns on or whether the transmitter spends excessive time on the air effectively "hogging" the bandwidth. One familiar with wireless communications will agree that ideally, each transmitter should be a "silent neighbor" that no other transmitter notices. While these ideal characteristics are rarely, if ever, attainable, a wireless system that creates a coexistence environment in which other wireless communication systems may operate reasonably well may be called a "good neighbor." The second aspect of coexistence of a wireless system is the ability of the system to operate reasonably well while other systems or wireless signal sources are present. In particular, the robustness of the system may depend on how well the system prevents interference at the receivers, on whether the receivers easily overload due to proximate sources of RF energy, on how well the receivers tolerate an occasional bit loss, and similar factors. In some industries, including the process control industry, there is a number of important potential applications of a wireless communication system. In these applications, loss of data is frequently not allowable. A wireless system capable of providing reliable communications in a noisy or dynamic radio environment may be called a "tolerant neighbor."

Coexistence relies (in part) on effectively employing three aspects of freedom: time, frequency and distance. Communication can be successful when it occurs at a 1) time when the interference source (or other communication system) is quiet; 2) different frequency than the interference; or 3) location sufficiently removed from the interference source. While a single one of these factors could be used to provide a communication scheme in the shared part of the radio spectrum, taking into account a combination of two or all three of these factors can provide a high degree of reliability, security and speed.

Figure 2:
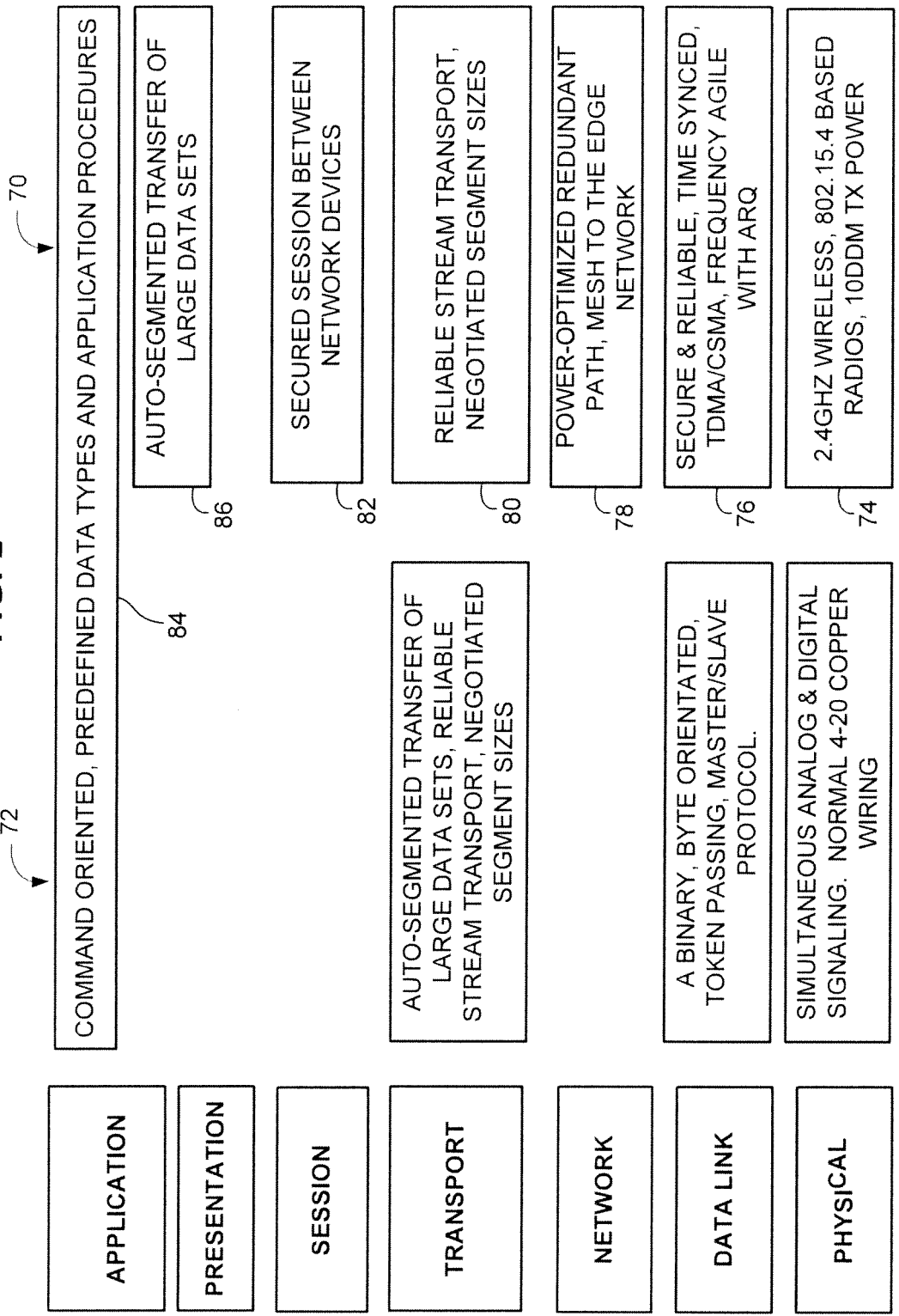
FIG. 2 is a schematic representation of the layers of a wireless HART protocol implemented in accordance with one of the embodiments discussed herein.

In one embodiment, the protocol supporting the wireless HART network 14 is a wireless HART protocol 70. More specifically, each of the direct wireless connections 65 may transfer data according to the physical and logical requirements of the wireless HART protocol 70. FIG. 2 schematically illustrates the structure of one of the embodiments of the protocol 70 and of the existing "wired" HART protocol 72. The wireless HART protocol 70 may be a secure, wireless mesh networking technology operating in the 2.4 GHz ISM radio band (block 74). In one embodiment, the wireless HART protocol 70 may utilize IEEE 802.15.4b compatible direct sequence spread spectrum (DSSS) radios with channel hopping on a transaction by transaction basis. This wireless HART communication may be arbitrated using time division multiple access or Time Division Multiple Access (TDMA) to schedule link activity (block 76). All communications are preferably performed within a designated time slot. One or more source and one or more destination devices may be scheduled to communicate in a given slot, and each slot may be dedicated to communication from a single source device or to a CSMA/CA-like shared communication access mode between multiple source devices. Source devices may send messages to specific target device or broadcast messages to all of the destination devices assigned to the slot.

To enhance reliability, the wireless HART protocol 70 may combine TDMA with a method of associating multiple radio frequencies with a single communication resource, or channel hopping. Channel hopping provides frequency diversity which minimizes interference and reduces multipath fading effects. In particular, the data link 76 may create an association between a single superframe and multiple carrier frequencies which the data link 76 cycles through in a controlled predefined manner. For example, the available frequency band of a particular instance of the wireless HART network 14 may have carrier frequencies $F_1, F_2, \ldots F_n$. A relative frame R of a superframe S may be scheduled to occur at a frequency $F_1$ in the cycle $C_n$, at a frequency $F_5$ in the following cycle $C_{n+1}$, at a frequency $F_2$ in the cycle $C_{n+2}$, and so on. The network manager 27 may configure the relevant network devices with this information so that the network devices communicating in the superframe S may adjust the frequency of transmission or reception according to the current cycle of the superframe S.

The data link 76 of the wireless HART protocol 70 may offer an additional feature of channel blacklisting, or restricting the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the wireless HART network 14. In some embodiments, the wireless HART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple wireless HART networks 14, the network manager 27 may create an overall schedule for each instance of the wireless HART network 14. The schedule may be organized into superframes containing time slots numbered relative to the start of the superframe. Additionally, the network manager 27 may maintain a global absolute slot count which may reflect the total of number of time slots scheduled since the start-up of the wireless HART network 14. This absolute slot count may be used for synchronization purposes.

The wireless HART protocol 70 may further define links or link objects in order to logically unite scheduling and routing. In particular, a link may be associated with a specific network device, a specific superframe, a relative slot number, one or more link options (transmit, receive, shared), and a link type (normal, advertising, discovery). As illustrated in FIG. 2, the data link 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

Other layers of the wireless HART protocol 70 are also illustrated in FIG. 2. Both the existing HART protocol 72 and the wireless HART protocol 70 are loosely organized around the well-known ISO/OSI 7-layer model for communications protocols. In the wireless expansion of HART technology, three physical layers and two data-link layers may be supported: the wired and the wireless mesh. Because the wireless HART protocol described herein allows deployment of mesh topologies, a significant network layer 78 may be specified as well.

As indicated above, a superframe may be understood as a collection of time slots repeating in time. The number of slots in a given superframe (superframe size) determines how often each slot repeats, thus setting a communication schedule for network devices that use the slots. Each superframe may be associated with a certain graph identifier. In some embodiments, the wireless HART network 14 may contain several concurrent superframes of different sizes. Moreover, a superframe may include multiple radio channels, or radio frequencies.

Further, the transport layer 80 of the wireless HART protocol 70 allows efficient, best-effort communication and reliable, end-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis.

In contrast, reliable communications allow devices to send acknowledgement packets. In addition to guaranteeing data delivery, the transport layer 80 may order packets sent between network devices. This approach may be preferable for a request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the wireless HART network 14 to activate a new superframe. Alternatively, a field device such as the sensor 30 may generate a packet and propagate the request to another field device such as the portable HART communicator 55. As another example, an alarm or event generated by the 34 field device may be transmitted as a request directed to the gateway 22. In response to successfully receiving this request, the gateway 22 may generate a response packet and send it to the device 34 acknowledging receipt of the alarm notification.

Referring again to FIG. 2, the session layer 82 may provide session-based communications between network devices. End-to-end communications may be managed on the network layer by sessions. A network device may have more than one session defined for a given peer network device. It is contemplated that in some embodiments, almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the wireless HART protocol 70 and the wired HART protocol 72 may support a common HART application layer 84. The application layer of the wireless HART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

Figure 3:
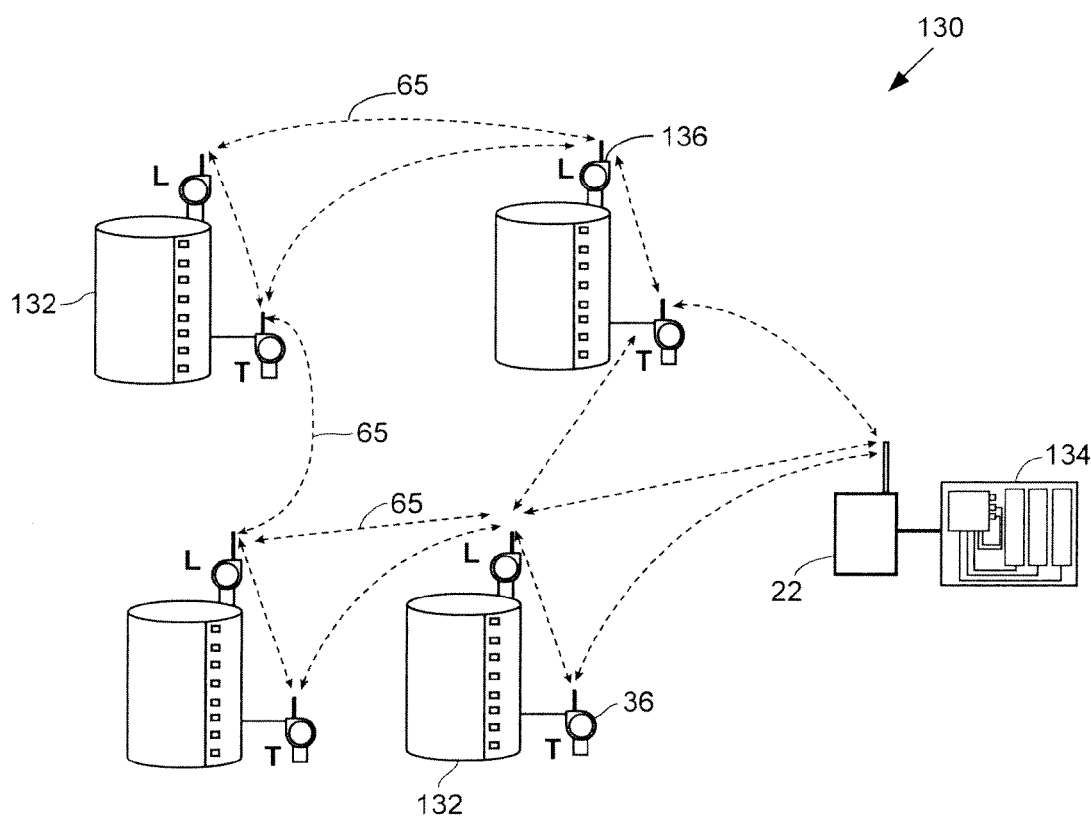
FIG. 3 is a block diagram illustrating the use of wireless HART devices with a tank farm.

In the example illustrated in FIG. 3, it is important to consider the location of the wireless devices on each tank so that the wireless network 14 can establish itself in an efficient and reliable form. In some cases, it may be necessary to add routers 60 in those locations where plant equipment could block or seriously affect a wireless connection. Thus, in this and in similar situations, it is desirable that the wireless network 14 be self-healing. To meet this design requirement, the wireless network 14 may define redundant paths and schedules so that, in response to detecting a failure of one or more direct wireless connections 65, the network 14 may route data via an alternate route. Moreover, the paths may be added and deleted without shutting down or restarting the network. Because some of the obstructions or interference sources in many industrial environments may be temporary or mobile, the wireless HART network 14 may be capable of automatically reorganizing itself. Specifically, in response to one or more predetermined conditions, pairs of field devices may recognize each other as neighbors and thus create a direct wireless connection 65 or, conversely, dissolve previously direct wireless connections 65. The network manager 27 may additionally create, delete, or temporarily suspend paths between non-neighboring devices.

Irrespective of whether a particular network configuration is permanent or temporary, the wireless HART network 14 requires a fast and reliable method of routing data between nodes. In one possible embodiment, the network manager 27 analyzes the information regarding the layout of the network, the capability and update rate of each network device, and other relevant information. The network manager 27 may then define routes and schedules in view of these factors.

FIGS. 4-6 illustrate some of the network topologies compatible with the routing and device addressing techniques of the present disclosure. In particular, FIG. 4 illustrates a network 150 arranged in a star network topology. The star network 150 includes a routing device 152 and one or more end devices 154. The routing device 152 may be a network device arranged to route data while the end device 154 may be a network device arranged to send data only on its own behalf and to only receive data addressed to the end device 154. Of course, the routing device 152 may also be a recipient and originator of data and may perform routing functions in addition to other tasks. As illustrated in FIG. 4, end devices 154 may have a direct connection 165 to the routing device 152 but end devices 154 cannot be connected directly in a star topology. The direct connection 165 may be a direct wireless connection 65 or a wired connection.

The end device 154 may be different or may be the same type of physical device as the routing device 152 and may be physically capable of routing data. The routing capability of the end device 154 may be disabled during the installation of the end device 154 or, alternatively, during operation of a corresponding network (such as the wireless HART network 14). Moreover, the routing capability of the end device 154 may be disabled by the end device 154 itself or by a dedicated service such as the network manager 27. In other embodiments, the end device 154 may contain only limited firmware or software and, as a result, may not be capable of routing data at all. In some sense, the star network 150 corresponds to the simplest of possible topologies, and may be appropriate for small applications that require low power consumption and low latency. Additionally, one of ordinary skill in the art will notice that the star network 150 is deterministic because there is only one possible route between the routing device 152 and a particular end device 154.

Moving on to FIG. 5, a network 170 is arranged in a mesh network topology. Each network device of the mesh network 170 is a routing device 152. Mesh networks provide a robust network with multiple paths. In wireless applications, mesh networks are better able to adapt to changing RF environments. For example, the device 174 of the network 170 may send data to the device 176 via an intermediate hop 178 or an intermediate hop 180. As illustrated in FIG. 5, both a path 182 and a path 184 enable the routing device 174 to send data to the routing device 176, providing redundancy and thus improved reliability to the network 170.

Referring again to FIG. 5, each of the paths 182 and 184 is a unidirectional path. In other words, the routing devices 174, 178, and 176, along with the path 182 form a directed graph. In one embodiment of the wireless HART network 14, all direct wireless connections 65 are unidirectional. Other embodiments which include bidirectional wireless connections are also contemplated. However, it should be noted that defining direct connections unidirectionally may provide an important advantage in designing wireless networks. More specifically, defining unidirectional connections automatically implies the definition of senders and receivers in the network. Meanwhile, a bidirectional connection additionally requires a sharing or conflict resolution scheme for the two hosts which may both receive and transmit at the same time.

Another network topology is illustrated in FIG. 6. The network 190 incorporates elements of both star and mesh topologies. In particular, the star mesh network 190 includes several routing devices 152 and end devices 154. The routing devices 152 may be connected in a mesh format and may support redundant paths. The selection of a particular topology may be performed automatically by a network component, such as the network manager 27, or by a user configuring the network. In particular, the user may choose to override the topology selected by the network manager 27 or the default topology associated with the wireless HART protocol 70. It is contemplated that in most applications, mesh topology may be the default topology because of the inherent reliability, efficiency, and redundancy of this topology. Clearly, because wireless HART devices may act as router devices, several different configurations may be compatible with the same physical disposition of field devices and routers.

The wireless HART protocol 70 may be configured in a number of different topologies to support various application requirements. As a result, wireless HART may support several methods of routing. In general, routing requires that each device be assigned a specific address on the network. Once every potential receiver of data acquires some form of unambiguous identification with respect to other network elements, decisions related to routing may be made by individual devices such as field devices 30-40, by a centralized dedicated service such as the network manager 27, or by individual devices acting in cooperation with the centralized service. Routing decisions can be made at the originating point, or source of a data packet or at a centralized location. Moreover, routing decisions can be adjusted at each intermediate stop, or "hop," in the path of the packet from the source to a destination.

In one contemplated embodiment, the wireless HART protocol 70 provides at least two approaches to routing that may be selected according to the specific requirements and conditions of a given system, such as the physical layout of the network elements that make up the system, the number of elements, the expected amount of data to be transmitted to and from each element, etc. Moreover, the two approaches may be used by a particular network at the same time and each may be selectively applied to a particular type of data or to a particular host or a set of hosts. As explained in greater detail below, the wireless HART protocol 70 may route certain type of data by defining a set of directed graphs, selecting the information relevant to each network device, and communicating the relevant information to each network device. For other types of data, the wireless HART protocol 70 may define routes between pairs of networks devices and route a data packet by specifying the complete list of intermediate hops in the packet header.

In mathematical theories and applications, a graph is a set of vertices (nodes such as 152 or 154) and edges (direct connections 65 or 165). The wireless HART protocol 70 may use graphs to configure paths connecting communication endpoints such as the device 30 to the gateway 22, for example. In some embodiments, graphs and the associated paths are configured by the network manager 27. The network manager 27 may also configure individual network devices such as field devices 30-40, routers 60, etc. with partial graph and path information. The wireless HART network 14 may contain multiple graphs, some of which may overlap. Further, a certain network device may have paths of multiple graphs going through a device, and some of the paths may direct data to the same neighbor of a device. In one embodiment, graphs are unidirectional and every graph in a network is associated with a unique graph identifier.

In the example illustrated in FIG. 7, the network 200 may define several directed graphs, each graph including either the gateway device 22 or a second gateway device 202 as the terminal node. In other words, the paths of each graph in the exemplary network 200 lead to and terminate at one of the two gateways 22 and 202. Specifically, a graph 210 (indicated by a solid black line) may include network devices 212, 214, 216, 218, and the gateway 22 while the paths associated with the graph 210 may include direct wireless connections 222, 224, 226, and 228. A graph 240 (indicated by a dotted black line) may include network devices 212, 216, 218, 242, and the gateway 202, with a path that includes direct wireless connections 244, 246, 248, 250, and 252. In the directed graph 210, the network device 212 may be called the head of the directed graph 210 and the gateway 22 may be called the tail of the directed graph 210. Similarly, the network device 212 is the head of the directed graph 240 and the gateway 202 is the tail of the directed graph 240. The network manager 27 or, under certain operating conditions, a backup network manager 257 may define graphs 210 and 240 and communicate partial definitions of the graphs to the network devices 212-218 and 242. In some embodiments, the gateway devices 22 and 202 may not require the information regarding the graphs 210 and 240 in those cases where the path terminates at one the gateway devices 22 or 202. However, it will be appreciated that the gateway devices 22 and 202 may also originate data and may store information regarding one or more graphs with paths originating from the gateway device 22 or 202. A path of a certain graph may traverse the gateway device 22 or 202; however, the exemplary network 200 defines paths either originating or terminating at the gateway device 22 or 202.

The exemplary network 200 may provide bidirectional communications between one of the network devices 212-218 or 242 and the gateway devices 22 and 202 by defining two unidirectional graphs for each pair of communicating devices. Thus, in addition to the graph 210, the network 200 may define an "inverse" graph (not shown) originating at the gateway 22 and terminating at the communicating device 212. This graph and graph 210 may include different intermediate nodes and direct wireless connections. Moreover, although these two graphs connect the same pair of devices, the graph 210 and the inverse of the graph 210 may have a different number of hops. Of course, in some possible configurations of the network 210, these graphs may include the same nodes and direct wireless connections and thus each pair of adjacent hops included in both graphs may have two unidirectional links, with one link defining upstream communication and the other link defining downstream communication. However, it will be appreciated that these two graphs may not necessarily provide the same delay or even signal quality.

To send a data packet along a certain graph, the source network device may include an identifier of the graph in the header or trailer of the data packet. The data packet may travel via the paths corresponding to the graph identifier until it either reaches its destination or is discarded. In order to be able to route packets in the graph 210, for example, each network device that belongs to the graph 210 needs to be configured with a connection table which contains entries that include the graph identifier and address of a neighbor network device which belongs to the same graph and is one hop closer to the destination. For example, the network device 216 may store the following connection table:

| Graph identifier | Node |
|---|---|
| 210 | 218 |
| 240 | 218 |
| 240 | 242 | while the network device 242 may store the following information in the connection table:

| Graph identifier | Node |
|---|---|
| 240 | 202 |

While the exemplary connection tables above simply list the devices associated with a particular entry, it will be noted that the Node column of the connection table may store the address of the neighboring device as defined in the addressing scheme of the network 200 or wireless HART network 14.

In another embodiment, the Node column may store the nickname of the neighboring device, an index into an array storing full or short addresses of the neighbors, or any other means of unambiguously identifying a network device. Alternatively, the connection table may store graph identifier/wireless connection tuples as illustrated below:

| Graph identifier | Connection |
|---|---|
| 210 | 226 |
| 240 | 246 |
| 240 | 248 |

In other words, the connection table may list one or more direct wireless connections 65 corresponding to a particular graph. The network device 216 may, for example, consult the connection table and transmit a packet carrying the graph identifier 240 via the direct wireless connection 246 or 248.

As illustrated in FIG. 7 and in the tables above, redundant paths may be established by having more than one neighbor associated with the same graph identifier. Thus, a packet arriving at the network device 216 and containing the graph identifier 240 in the header or trailer may be routed to either or both the network device 218 or the network device 242. While executing the routing operation, the network device 216 may perform a lookup in the connection table by the graph identifier 240, and send the packet to either or both of the network devices 218 and 242. Moreover, the routing selection between two or more possible hops may be random or may be carried out according to a predefined algorithm. For example, the selection may be made in consideration of a load balancing objective or in view of the delivery statistics. Thus, the network device 216 may learn, through a peer network device or from the network manager 27, that selecting the network device 218 as the next hop while routing packets along the graph 240 has a lower probability of delivering the packet successfully or a longer delay in delivery. The network device 216 may then attempt to route more of possibly all of the packets associated with the graph 240 to the network device 242.

In one embodiment, receipt of packets by a neighboring device is acknowledged by a confirmation packet. In the example above, once the neighboring network device 218 or 242 acknowledges receipt of the packet, the network device 216 may release it. If, on the other hand, the acknowledgement is not received within a predefined time period, the network device 216 may attempt to route the packet via the alternate hop. Additionally, the network device 216 may collect statistics of both successful delivery attempts and of failed delivery attempts. The subsequent routing decisions, such as selecting between the hops 218 and 242, may include the adjusted statistical data. Of course, the network device 216 may apply the statistics related to network devices 218 and 242 to other relevant graphs and may also communicate the statistics to other network devices, either directly or via the network manager 27.

As discussed above, in the graph routing approach, a network device sends packets with a graph identifier in a network header along a set of paths to the destination. Importantly, a graph identifier alone is sufficient for routing packets and, while other routing information may be included in the header, each packet can be properly delivered based solely on the graph identifier. All network devices on the way to the destination may be pre-configured with graph information that specifies the neighbors to which the packets may be forwarded. Because graph routing requires pre-configuration of intermediate network devices for each potential destination, graph routing may be better suited for communications from a network device to a gateway and from a gateway to a network device.

The wireless HART network 14 or the network 200 may also use source routing. In source routing, pre-configuration of the forwarding devices is not necessary. To send a packet to its destination using source routing, the source network device may include in the header of a packet an ordered list of devices through which the packet must travel. As the packet is routed, each routing device may extract the next node address from the packet to determine the next hop to use. Consequently, using source routing requires knowledge of network topology. If, however, a certain network device does not find itself on the routing list, the network device may send the packet back to the first device specified in the source routing list. Source routing allows packets to go to an arbitrary destination without an explicit set up of intermediate devices.

For example, the network device 212 may send a packet to the the gateway 22 by specifying the complete path in the packet header or trailer. Referring again to FIG. 7, the network device 212 may generate a list containing the addresses of network devices 214 and 218 and send the list along with the packet to the first hop on the list, the network device 214. The network device 214 may then traverse the list, locate the identity of the network device 214 and extract this field from the list, identify the network device 218 as the next hop for the received packet, and finally send it to the network device 218. The source routing list may reside in the optional area of the network header, and may be of variable size depending on number of hops to the destination.

In one embodiment, only those network devices that have obtained full network information from the network manager 27 use source routing because only the network manager 27 knows the topology of the network. An additional limitation of source routing is that it provides no redundancy at intermediate network devices because each packet contains an explicit list of hops to take and no alternatives. Thus, if one of the devices fails to send the packet as specified, no alternate direction is taken. It is therefore the responsibility of the network manager 27 to detect the failure and reprogram the source with an alternate route. To facilitate the detection of such error cases, the wireless HART protocol 70 may require network devices to send a routing failure notification back to the network manager 27. In another embodiment, the routing list may specify alternate routes in addition to the route selected by the sender. In yet another embodiment, primary and one or more alternate routes may be merged to avoid duplication of common parts of the path in the packet header or trailer.

In accordance with some of the embodiments discussed above, the network manager 27 contains a list of all devices in the network. The network manager 27 may also contain the overall network topology including a complete graph of the network and portions of the graph that have been communicated to each device. The network manager 27 may generate the route and connection information using the information that the network manager 27 receives from the network devices 30-40, 50, 60, 55, 212-218, etc. The graph of the network is built from the list of network devices and their reported neighbors. The network manager 27 may also be responsible for generating and maintaining all of the route information for the network. In one embodiment, there is always one complete network route and several special purpose routes which are used to send setpoint and other settings from the gateways 22 or 202 to the final control commands. Further, there may be broadcast routes used to send broadcast messages from the network manager 27 or 257 to all of the devices of the network 14 or 200. Still further, the network manager 27 may also carry out the scheduling of network resources once the routing information and burst mode update rates are known.

When devices are initially added to the network 200 or 14, the network manager 27 may store all neighbor entries as reported from each network device. The network manager 27 may use this information to build an initial complete network graph (or set of network graphs including forward graphs and reverse graphs) and revise the graph in operation. Each network graph may be developed by optimizing several properties including hop count, reporting rates, power usage, and overall traffic flow as reflected by the statistics gathering discussed above. One key aspect of the topology is the list of connections that connect devices together. Because the presence and health of individual connections may change over time, the network manager 27 may be additionally programmed or configured to update the overall topology, which may include adding and deleting information in each network device. In some embodiments, only the network manager 27 or 257 and the gateway 22 or 202 know enough information to use source routing. More specifically, it may be desirable not to allow peer-to-peer communication between any two arbitrary devices for security purposes.

In short, graph routing may direct traffic both upstream and downstream with respect to the network manager 27 or gateway 22 and both graph and source routes can be optimized to satisfy applications with low latency requirements, which includes measurement information that is transferred from network devices to the gateway and control information that is transferred from gateway devices to final control commands such as regulating valves, on-off valves, pumps, fans, dampers, as well as motors used in many other ways.

In some embodiments, path redundancy is a matter of policy of the network manager 27 rather than a coincidental overlap of graphs. In other words, the network manager 27 may attempt to define at least two neighbors for each device. Thus, the network manager 27 may be configured to actively pursue a mesh or a star mesh topology. The wireless HART protocol 70 may thus provide a very high end-to-end data reliability. From the physical perspective, each field device should be within communication range of at least two other devices that can receive messages from the field device and forward them.

The network manager 27 may additionally verify each graph definition in order to ensure that no loops have been formed. In those embodiments where the network manager 27 actively pursues path redundancy and defines many graphs of various sizes, a communication path may be sometimes erroneously defined to direct data packets from a source back to the same source. In accordance with such faulty graph definition, a packet may be routed back to the source directly from the source or may visit one or more intermediate hops prior to arriving back at the source. Loop verification may be performed each time the topology of the associated network changes, such as due to an addition or removal of a device, or whenever the network manager 27 adjusts the routing graphs and schedules for any reason. Alternatively, the network manager 27 may perform loop checking periodically as a background task.

As indicated above, devices involved in routing store or obtain a different graph route, the source route, or to the address of the destination in order to deliver and properly relay data packets. The address of each network device must be globally unique in order for the wireless HART network 14 to properly co-operate with a larger network which may include wired HART devices. For this reason, the wireless HART protocol 70 provides an unambiguous addressing scheme and additionally provides an efficient mapping of addresses to a larger network context. Importantly, the wireless HART protocol 70 provides an addressing scheme compatible with the addressing scheme used with wired HART devices.

FIG. 8 illustrates an exemplary architecture of the network design tool 45. An engine 300 may contain the tool logic and may include a graph generator 302 and a schedule generator (or "scheduler") 304 which may, in turn, interact with each other to generate or make combined routing and scheduling decisions. The engine 300 may also include a set of optimization rules 306. Each of the optimization rules 306 may contain an algorithmic description of a certain aspect of the optimization strategy and may also depend on one or more user parameters. For example, one of the optimization rules 306 may state that creating more than X number of connections to a certain node is prohibited. The user may assign a specific value to X via the user interface 312 so that the engine 300 can apply the rule during operation. In short, the engine 300 may encapsulate the intelligent components of the network design tool 45. The engine 300 may interact with one or more instances of a user interface 310-312. In some embodiments, the network design tool 45 may run in a distributed manner and may provide simultaneous access to the functionality of the engine 300 to multiple operators. For example, the workstation 16 may execute or provide the user interface 310 while the remote host 41 may execute the engine 302 and the user interface 312. Each of the user interface instances 310 and 312 may be tailored according to the hardware availability at each corresponding host and may further be tailored to the specific requirements and preferences of the operator such as language, for example. As illustrated in FIG. 8, the user interface 312 may interact with such physical devices as a mouse 314, a keyboard 316, a monitor 318, and possibly a printer (not shown). One skilled in the art will further appreciate that the user interface 312 or the user interface 310 could be similarly connected to other input and output devices.

As indicated above, the network design tool 45 may provide a user interface via one or several interactive windows. As one familiar with the Microsoft Windows™ or similar graphic environment will recognize, an interactive window typically includes a canvass area containing text and graphics, a toolbar providing access to various functions of the corresponding software, buttons disposed on the toolbar providing shortcuts to the frequently used functions or graphical objects, and vertical and horizontal scrollbars which allow user to align the visible window with specific parts of the canvas. Generally speaking, the network design tool 45 may be implemented on any operating system. However, the operating system on which the user interface component of the network design tool 45 is executed preferably supports a graphical interface. In the embodiments discussed below, the network design tool 45 allows users to manipulate visual objects in form of geometric shapes such as circles, squares, and arrows, although other graphic objects may be used. Further, the network design tool 45 may render the graphic objects on the monitor 318 in different colors to indicate the state of the object or convey other additional information.

Referring again to FIG. 8, the engine 300 may also interact with one or more instances of a live network interface 320. The live network interface 320 may report data from the wireless HART network 14 to the engine 300. In particular, the live network interface 320 may report the measurements related to the signal strength, time delay, and other network performance data measured by the network devices of the network 14. In response to receiving network performance data from the network 14 via the live network interface 320, the engine 300 may communicate these reports to one or more users via the user interfaces 310 or 312. Additionally, the engine 300 may automatically adjust routing and scheduling of a network model 324 corresponding to the wireless network 14. As illustrated in FIG. 8, the network model 324 may be stored in a memory 326 coupled to one of the hosts 16, 18, 41, 47, or 55.

Referring to FIG. 9, the network design tool 45 may present, to one or more users interacting with the user interface modules 310 or 312, a main menu 340 which may provide access to such features of the network design tool 45 as network configuration and network simulation. In the exemplary embodiment illustrated in FIG. 9, the main menu 340 may include a file submenu 342, a graph generating options submenu 344, a topology submenu 346, and a schedule submenu 348. Specifically, the file submenu 342 may provide a standard set of file manipulation functions such as saving the network model 324 in the memory 326 or other storage location or sending a file containing the network model 324 to a printer. Meanwhile, the graph generating options submenu 344 may provide access to path selection rules 350, graph type selection 352, and other user-configurable rules and parameters.

By invoking the topology submenu 346 from the main menu 340, the user may access an interactive canvass screen containing a drawing corresponding to the network model 324. The topology submenu 346 may include the interfaces 354 for adding and deleting nodes, editing signal strength, changing the views of the network model 324, and automatic graph generation. On the other hand, the schedule submenu 348 may present several options with respect to displaying the generated schedules. For example, the graph view 356 may render a multi-color, user-friendly visual representation of an entire network schedule, also referred to as the master schedule. The text view 358 may offer a textual description of the same master schedule. Finally, the XML view 360 may generate a textual description of the master schedule which conforms to the rules of XML.

Moving on to FIG. 10, an interactive window 380 may present a view of the network model 324 accessible to a user via the topology submenu 346. The interactive window 380 may include a canvass area 382, a toolbar 384, and scrollbars 386-388. The toolbar 384 may provide interactive access to the submenus 342-348 in form of pull-down lists, for example. Additionally, the toolbar 384 may include one or more shortcut buttons 390. The shortcut buttons 390 may provide user with an easy and efficient method of adding symbols representing various network devices to the canvass area 382. In particular, the user may operate one of the shortcut buttons 390 to select a symbol representing a gateway device, a network access point, a field device, a router, etc. Additionally, the toolbar 384 may include non-network element buttons 392 corresponding to physical obstructions such as walls. The user may then drag the selected symbol onto the canvass area 382 using the mouse 314 or a similar pointing device. In other embodiments, the user may operate keyboard keys to enter text commands in order to select symbols and position these symbols in the canvass area 382.

The canvass area 382 may be a symbolic representation of a plant area in which the wireless HART network 14 operates. The placement of symbols representing network devices may accurately reflect the relative distances between the devices. In other words, the graphical representation of the model 324 on the canvass area 382 may be to-scale. It is also contemplated that the canvass area 283 may include a grid (not shown) in order to simplify the task of accurately placing the symbols relative to each other. In yet another embodiment, the canvass area 283 may include a schematic representation of the plant. For example, the canvass area 382 may include two-or three-dimensional, to-scale representation of tanks, valves, pipes, and other components of a process control system so that the user may easily see the correspondence between the model 324 and the actual geographic positioning of the corresponding physical devices. Still further, the canvass area 382 may schematically represent the actual physical obstructions such as walls as well as inaccessible or "forbidden" areas such as hallways or offices. In accordance with this embodiment, the network design tool 45 may take physical obstructions into account without requiring the user to specify the draw an obstruction symbol by operating the obstacle element buttons 392.

After placing a symbol representing a network device or an obstacle on the canvass area 382, the user may further configure the modeled device by selecting the symbol, invoking an interactive parameterization window, and entering a set of parameters specific to the modeled device. In the example illustrated in FIG. 10, the user has placed several network devices symbols on the canvass area 382, including the device symbol 400. More specifically, the user may have selected the symbol representing a field device from among the shortcut buttons 390, activated the symbol by a mouse click or similar method, and dragged a copy of the symbol to the desired location in the canvass area 382. In this exemplary embodiment, the field device symbol is a circle enclosing a letter "D," the letter serving as a visual aid in differentiating between various network device types. The user may have then invoked a parameterization menu by clicking on a predefined mouse button, for example, and specified that the physical field device corresponding to the device symbol 400 is powered by means of a battery. As a result, the wireless network device tool 45 may display a battery symbol 402 next to the device symbol 400.

The user may further specify, for each field device, the rate at which the device reports measurements or other data to another network device. This report rate is also known as burst rate. In the example of the wireless HART network 14, field devices report data upstream to the gateway device 22. The wireless network device tool 45 may display the burst rate as an indicator 404 placed next to the device symbol 400. The user may further specify the power at which the physical device corresponding to the device symbol 400 transmits radio signals. In one embodiment, the user may invoke a power setting option by pressing on a predefined keyboard or mouse key. In response to detecting the key press event, the network design tool 45 may display an interactive window in which the user may enter the signal strength measured in watts, for example. Alternatively, the user may configure the network design tool 45 to associate each network device with a same predetermined power level in order to simplify the process of configuring the network model 324.

As device symbols are added to the canvass area 382, the network design tool 45 may assign a sequence number to each new symbol. In another embodiment, the network design tool 45 may assign numbers according to the order in which the symbols are encountered in breadth-first traversing of a corresponding graph, with one of the gateway symbols assigned the sequence number 0 and placed at the head of the graph. In the example illustrated in FIG. 10, the network design tool 45 may display the sequence number as an indicator 406 next to the device symbol 400.

Referring again to FIG. 10, the user may have placed a gateway symbol 410 and a network access point symbol 412 on the canvass area 382. As discussed above with reference to FIG. 1, a gateway device 22 may be connected to multiple network access points 25 in a highly reliable and efficient manner, such as over a pair of dedicated wires. The network design tool 45 may indicate the relative reliability of the gateway-to-network access point connection by means of a solid line representing a wire link 414. In contrast, the network design tool 45 may illustrate wireless links by means of a dotted line as, for example, in the case of a wireless link 416 between the device symbols 400 and 412. Of course, the wireless and wired connections between network devices may also be depicted in any other manner and the lines 414 and 416 are provided by way of example only.

Next, the network design tool 45 may begin analyzing the network model 324 by evaluating the quality of every wireless link between every pair of network devices in view of such factors as the signal strength at each device, the distance between the devices, the power of each device, the type of receiving device, and the presence of obstacles which may attenuate the radio signal. Because each device may transmit radio signals at a unique power level, the parameters of a uni-directional link from device A to device B may be different from the parameters of a uni-directional link from device B to device A. For example, the network design tool 45 may estimate the quality of a uni-direction wireless link 404 by calculating the attenuation of a radio signal transmitted by the physical device corresponding to the device symbol 400 over the distance between the physical network devices represented by symbols 400 and 412. As indicated above, the distance between the devices represented by symbols 400 and 412 may be accurately reflected by the relative placement of the symbols 400 or 412 if the model 324 is drawn to scale. Alternatively, the user may specify the distance between a pair of network devices by selecting a wireless link on the network model 324, activating an appropriate setting screen, and entering the distance in feet or meters, for example. Upon completing the calculation, the network tool 45 may display a signal quality indicator 420 next to the wireless link 416. Referring again to FIG. 10, a symbol 422 representing a field device and a symbol 424 representing a router device may be connected by a wireless link may be separated by a distance X while the symbol 422 and a symbol 426 may be separated by a distance Y. The network design tool may accordingly display indicators 428 and 430 next to unidirectional links extending from device 422 to devices 424 and 426, accordingly.

The network design tool 45 may assess each wireless link as the user adds new network devices to the canvass 382. Thus, if the network model 324 includes network device symbols S1, S2, . . . Sn, the addition of a device symbol Sn+1 requires that the network design tool 45 evaluate n new links between each pair of symbols {S1, Sn+1}, {S2, Sn+1}, . . . {Sn, Sn+1}. In order to avoid clutter, the toolbar 384 may include buttons 432 which toggle optimized presentation modes. More specifically, one of the toggle buttons 432 may cause the network design tool 45 to display only those wireless links that pass a predefined quality criteria, such as, for example, the signal quality exceeding –10 dB. Conversely, another toggle button 432 may cause the network design tool 45 to display all wireless links, irrespective of the quality.

A collection of wireless links which pass a predefined set of quality criteria, along with the wired links connecting gateway devices to network access points, forms a master graph 435. Additionally, each path between a pair of network devices, such as the path from the field device symbol 422 to the gateway device symbol 412, forms an individual graph. Moreover, each graph may be an upstream or downstream graph with respect to one of the gateways. The network design tool 45 may illustrate the direction of each wireless link by means of an arrow, such as the arrow on the link 416 pointing in the direction of the network access symbol 412 to indicate that the link 416 is part of an upstream graph. The toolbar 384 may also contain a graph mode selector 437 which the user may operate in order to select between such viewing options as the display of downstream graphs only, the display upstream graphs only, or the simultaneous display of both upstream and downstream graphs.

As illustrated in FIG. 11, an interactive screen 450 may correspond to the graph generating options submenu 344. The user may use the interactive screen 450 in order to configure the preferences regarding path selection and scheduling on a network simulated by the network model 324. In this exemplary embodiment, the interactive screen 450 may include a network type selector 452 which allows the selection between star, mesh, and star mesh topologies. If, for example, the user selects star topology via the network type selector 452, the network design 45 automatically defines wireless connections consistent with star topology, with a gateway device or a network access point as a center. In the case of the network model illustrated in FIG. 10, each wireless connection between a pair of field devices is eliminated. Instead, the network design tool 45 may simulate a wireless connection between such device symbols as 412 and 422, 412 and 424, etc.

Further, the interactive screen 450 may include a threshold signal strength selector 455. By using the selector 455, the user may specify the minimum strength of a signal transmitted from a sender device which must be detected by a recipient device in order to consider a link between the sender device and the recipient device acceptable for use in a graph. Of course, the user may use the selector 455 at any time during the configuration of the network model 324 to change this minimum signal strength value. In response to the user entering a new value by means of the selector 455, the network design tool 45 may re-evaluate each pair of devices and, in some cases, either delete or add wireless links. In the example illustrated in FIG. 11, the selector 455 includes a scrollbar and a text indicator. However, one of ordinary skill in the art will recognize that any graphical or textual implementation of the selector 455, as well as of other selectors discussed herein, is equally possible.

A hysteresis level selector 457 may allow the user to specify a signal strength at which the network design tool 45 begins re-evaluating the network graph. If the feedback information reported to the network design tool 45 from the live wireless HART network 14 indicates a change in the signal level of one or more links, the network design tool 14 may refer to the value set via the hysteresis level selector 457 to decide when graph re-evaluation must begin. For example, the strength of a signal at a particular link may drop slightly below the minimum level configured via the selector 455 but may still be above the hysteresis level configured via the selector 457. In this case, the network design tool 45 may not yet proceed with graph evaluation in order to avoid such situations as, for example, re-evaluating a network graph when the signal strength periodically drops slightly below and later rises above the threshold signal level.

The interactive screen 450 may also include a neighbor number selector 459. By using the selector 459, the user may specify the maximum number of neighboring devices to consider at each individual network device during graph construction. For example, the network device represented by the symbol 400 may potentially establish wireless links with all seven wireless network devices corresponding to the network model 324. Of course, each wireless link may have different signal strength due to the distance from the transmitting device and other physical factors and, therefore, a different overall link quality. Thus, it may not be prudent to attempt establishing a connection with each potential neighbor. Instead, an efficient graph selection strategy may focus on only a limited number of potential neighbors. The value selected via the selector 459 may restrict the number of potential neighbors to a small value such as 3, for example, even if more than 3 neighbors of a certain device satisfy the signal strength requirement configured through the selector 455.

Further, the interactive screen 450 may include a selector 461 for specifying the criteria for choosing between a multi-hop link characterized by relatively good signal strength and a single-hop link characterized by relatively poor signal strength. In general, a single-hop link between a pair of devices is preferable because of the lower latency and relative simplicity of the scheduling, among other factors. However, the signal quality of a single-hop may be poor compared to a multi-hop link connecting the same pair of devices. In order to make a proper selection between these options, the tradeoffs associated with each approach must be quantified and compared. In the exemplary embodiment illustrated in FIG. 11, the user may specify a number of decibels by which the signal strength of a multi-hop must exceed the signal strength of a corresponding single-hop link in order for the network design 45 to choose the multi-hop link over the single-hop link.

Referring again to FIG. 11, the interactive screen 450 may further include a minimum hop number selector 463. The user may specify the minimum number of hops for the network design tool 45 to consider when constructing graphs. The minimum number of hops may default to, for example, "1" but could default to another number if so desired. A maximum hop number selector 465 may allow the user to specify the maximum length of an individual graph measured in hops and may default to a particular number, such as "4") although the default may be different for different uses. For example, the user may decide that the process control system using the wireless HART network 14 may not tolerate delays associated with default setting of 4-hop paths between devices and may set the hop limit at 3 via the selector 465. As a result, the network design tool 45 will not define graphs and, therefore, paths which include more than 3 hops even if this limitation results in the selection of wireless links of a relatively poor quality. The selectors 450 and 465 allow the tool or engine 300 to consider both the minimum number of hops (e.g., default to 1) and the maximum number of hops (e.g., default to 4) when developing a set of graphs and routing schedules for the network. In addition, if desired, these and each of the other selectors described herein may be settable on a per-node basis, which gives the user the ability to decrease latency to critical items such as valves.

In the exemplary embodiment of the interactive screen 450, the user may additionally quantify the desirability of routing data through network devices powered by a permanent power source such as a 110V AC line as compared to battery-powered network devices. For example, the user may enter the number "3" into a window of a disadvantage factor selector 467. As a result, the network design tool 45 may consider each hop through a powered network node 3 times as preferable as a hop through an unpowered network node if all other factors are the same.

In general, the network design tool 45 and in particular the engine 300, when making graph and scheduling decisions, may weigh in multiple factors by assigning numerical desirability indicators to potential links or graphs and by applying the optimization rules 306 in a predefined order. Because some of the rules may direct the network design tool 45 toward incompatible approaches, such as bypassing a certain node according to one rule and routing data through the same node according to another rule, assigning relative priority to the optimization rules 306 helps the network design tool 45 resolve these conflicts. FIG. 11A illustrates an exemplary procedure 500 which the network design tool 45 may execute as part of automatic graph definition. As discussed above, the network design tool 45 may invoke the procedure 500 when the user adds new devices to the canvass 382, when the feedback information regarding the actual performance of the wireless HART network 14 arrives at the live network interface 320, or in response to a user operation such as a predefined key press or menu option selection. It will be appreciated that while FIG. 11A illustrates the application of the optimization rule 306 in form of a sequence of steps, some of the steps may also be executed in parallel. Moreover, some of the optimization rules 306 may not present a conflict with the other rules at any time and may therefore apply at any stage of the procedure 500.

A principle 502 may be applied as a first step of executing the procedure 500. In particular, the procedure 500 may first attempt to define, whenever possible, single-hop paths to the gateway 22 or, in case redundant gateway devices are available, to the virtual gateway 24. In those embodiments where the gateway 22 communicates with the wireless HART network 14 via one or more network access points 25, the single-hop paths may be defined relative to one of the network access points. Of course, the procedure 500 may not violate the limits configured via the interactive 450 and, in particular, the threshold signal strength limitation specified via the selector 455. Referring back to the network model 324 illustrated in FIG. 10, the procedure 500 has determined, for example, that the physical device corresponding to the device symbol 400 may establish a single-hop wireless link 416 to the network access point corresponding to the symbol 412 but that the device corresponding to the symbol 422 must communicate with the network access point (symbol 412) via an intermediate node such as field device represented by the symbol 426.

Referring again to FIG. 11A, a principle 502 may correspond to the preference to route data through powered devices. In accordance with the principle 502, the procedure 500 may attempt to bypass the device corresponding to the symbol 400 because this device is battery-powered. However, the procedure 500 may decide whether this device should be bypassed also in view of the value the user has specified by means of the selector 467. As indicated above, other factors may make the alternate nodes equally or more undesirable and the procedure 500 must use quantitative criteria when comparing the alternatives.

Next, the procedure 500 may proceed to defining the rest of the graphs while trying to keep the number of hops of each individual graph as low as possible. In one contemplated embodiment, the procedure 500 may initially construct a master graph which includes all potential wireless links irrespective of their quality. The procedure 500 may then consider each network device in sequence, traverse the initial master graph to identify all potential routes, and select the best candidates in view of the factors discussed above and other considerations. Specifically when applying a principle 506 to the initial master graph, the procedure 500 may select graphs with lower numbers of hops that also satisfy user requirements configured via the interactive screen 450.

When choosing between neighbors of a particular device during path selection, the procedure 500 may apply a principle 508, whereby a link with a better signal strength is given preference. However, the procedure 500 may not necessarily make a definite selection of paths upon considering the principles 502-508. In a block 510, the procedure 500 may assign numeric values, or weights, to each link according to the agreement of each link with one or more of the principles 502-508. For example, the procedure 500 may multiply the weight of a link originating from a certain network device by the factor entered via the selector 467 because the network device is powered. On the other hand, the procedure 500 may increase the weight of a different link originating from the same network device because this link is part of a shorter path to the gateway, as measured by the number of hops. The procedure 500 may then select between the two links in a block 512 by executing a trivial comparison between the two numerical values.

The procedure 500 may apply the hop count and the neighbor count limitations while defining graphs according to the principles 502-508. In other words, the procedure 500 may check whether every path and link selection carried out at the block 512 is consistent with the every rule specified through the interactive screen 450. Alternatively, the procedure 500 may apply the hop count and neighbor count limitations in blocks 514 and 516, respectively, upon completing the selection of weighted routes in the block 512. In this case, the procedure 500 may eliminate some of the previously selected links and paths and return to the block 512.

Further, the procedure 500 may try to select at least two paths for each device in the block 512, for example, to ensure path redundancy. In other words, the procedure 500 may attempt to allocate at least one distinct duplicate path in addition to the selected primary path so that the duplicate path connects the same pair of devices. In this manner, a failure in one of the nodes of the primary path or an unexpected obstruction between a pair of nodes in the primary path will not necessarily prevent the devices from communicating. The network design tool 45 may indicate the availability of a redundant path connecting a field device to the gateway by coloring the corresponding symbol. FIG. 12 illustrates a network model which is generated by the network design tool 300 after a use has invoked the interactive window 450, and after the network model 324 illustrated in FIG. 10 has been constructed. In particular, the user may have operated the threshold signal strength selector 455 to increase the threshold value. As a result, the network design tool 450 may have eliminated some of the duplicate links and the symbol 400 now appears in a different color than in FIG. 12. By contrast, the symbol 426 appears in the original color because the symbol 426 appears as both a node in the path connecting the symbol 400 to the network access point symbol 412 and as a node in the path connecting the symbols 520 and 522 to the symbol 412. Moreover, as illustrated in FIG. 12, the device represented by the symbol 422 is now disconnected from the wireless HART network 14 because none of the links potentially connecting this device to its neighbors satisfies the new user requirements.

Referring now to FIG. 13, the user may operate the obstacle button 392 to place an obstruction symbol 530 on the canvass area 382. In one embodiment, the user may further customize the obstruction by stretching the symbol 530 or outlining an irregular shape using one of the well-known drawing means. In another embodiment, the user may further specify a signal attenuation factor of the obstacle represented by the symbol 530 by clicking on the symbol 530 and entering a numerical value in decibels via an obstacle configuration menu. In yet another embodiment, the user may additionally simulate a moving obstacle by specifying one or more animation parameters. It is contemplated that the network design tool 45 may simulate the disturbance caused by an obstacle moving at a specified speed in view of the burst rates of the devices affected by the obstruction. Of course, a device reporting measurements only once a minute may not "notice" an obstacle substantially cutting off the communication link of the device for only one or two seconds, while another device reporting measurements every second may fail to propagate one or several reports under the same set of conditions. Thus, some of the embodiments of the network design 450 may simulate the impact of both stationary and moving obstacles on various network devices.

FIGS. 13 and 14 illustrate one aspect of network simulation provided by the network design tool 45. In FIG. 13, the obstacle 530 is sufficiently removed from the network devices represented by symbols 400, 412, and 532 so as not to cause significant disturbance of the wireless links connecting these devices. On the other hand, in the state of the network model 324 illustrated in FIG. 14, the same obstacle may effectively block the propagation of radio signals from the device corresponding to the symbol 400 to the network access point represented by the symbol 412. As discussed above, FIGS. 13 and 14 may illustrate the network model either statically, in which case a stationary obstacle represented by the symbol 530 has been repositioned closer to the network nodes, or a snapshot of a transient state of the network model 324, in which case a moving obstacle is temporarily interfering with the wireless link 416. In either case, the network design tool 45 may calculate the impact of the simulated obstacle on the network model 342 and may delete the wireless link 416.

In addition to generating and automatically adjusting graphs, the network design tool 45 may automatically generate schedules according to the optimization rules 306 and, optionally, user-specified parameters. FIGS. 14A-14C illustrate several exemplary sequences of steps which the network design tool 45 and, in particular, the scheduler 304 may carry out as part of generating and optimizing the master schedule of the wireless HART network 14. More specifically, the scheduler 304 may include procedures responsible for constraint enforcement, data superframe configuration, network management configuration, gateway superframe configuration, and special purpose superframe configuration.

Similar to the procedure 500, a procedure 550 may apply at least some of the principles 552-572 simultaneously or may alter the sequence of applying the principles 552-572 to a master schedule being developed. The procedure 550 is primarily responsible for enforcing various design constraints on each individual schedule as well as on the master schedule. In a block 552, the procedure 552 may apply the principle of limiting the number of concurrent channels. Of course, the number of concurrent channels is limited by the number of radio frequencies available to the wireless HART network 14. In one contemplated embodiment, the user may configure the limit via the screen 450 or a similar interactive menu. Additionally, the network design tool 45 may include a relatively high hard-coded limit as a safeguard against configuration mistakes. For example, the absolute concurrent channel limit may be 16.

Next, the procedure 552 may apply a principle 554, whereby no device may be scheduled to listen twice in the same time slot. In accordance to the next principle 556, the procedure 552 may allow devices to receive data from multiple destinations. Referring back to the example illustrated in FIG. 11, the device corresponding to the symbol 426 may receive data both from the device corresponding to the symbol 400 and from the device corresponding to the symbol 422.

While applying the principle 558, the procedure 552 will schedule early hops before later hops on a multi-hop network. In other words, the procedure 552 will attempt to minimize the latency on each multi-hop path by ensuring that each node has as many available timeslots as possible to forward a recently received data packet. For example, a node N1 may receive a packet for N2 in the timeslot with a relative number 5 in a 32-timeslot superframe. Thus, the node N1 may have 27 potential timeslots in the remaining part of the superframe. The scheduler 304 may identify the next available timeslot within the superframe (such as 8, for example) and schedule the transmission from N1 to N2 to occur in that slot.

In order to optimize the alignment of superframes, the scheduler 304 may enforce the principle 560 requiring that all burst rates and, therefore, superframe sizes, conform with a predefined formula. For example, the burst rates may be defined as 2n seconds, where n is an integer. Thus, one network device may have a burst rate of 2-2 or four times a second, and another device may have a burst rate of 23 or once every 8 seconds. Further, the procedure 550 may ensure that the combined burst mode and network management communications do not exceed a predefined percentage of the total bandwidth available to the wireless HART network 14 (principle 562). In one contemplated embodiment, this predefined percentage is set at 30%. Similarly, the procedure 550 may ensure, in accordance with the principle 564, that none of the schedules exceeds a predefined ratio, such as 50%, of the total number of available timeslots. In this manner, the scheduler 304 attempts to reserve a sufficient number of free slots for such purposes as retries and other unplanned transmissions.

Referring now to FIG. 14B, the procedure 565, which is responsible for data superframe configuration, may apply a principle 566 and assign network devices to channel offsets starting with slot 0. Next, the procedure 565 may allocate timeslots starting with the fastest scan rate (block 568). By starting with the fastest scan rate, the scheduler 304 ensures that higher bandwidth demands are satisfied first because it is generally easier to find available timeslots for those devices which transmit infrequently and thus have lower scan rates.

For each path, the procedure 565 may start slot allocation from a device farthest from the gateway (block 570). In particular, the procedure 565 may allocate one slot on the path to the gateway device, move on to the next hop in the path, and continue slot allocation until reaching the gateway. Upon successfully allocating each individual slot, the procedure may also allocate the closest available slot for a potential retry.

Once the procedure 565 allocates the timeslots for one path between each field device and the gateway, the scheduler 304 may additionally attempt to allocate timeslots on each duplicate path. As discussed above, a duplicate path connects the same pair of devices as the primary path but is distinct from the primary path in at least one intermediate hop. The procedure 550 attempts to allocate timeslots for the duplicate paths in a block 572.

FIG. 14C illustrates a procedure 580 which the scheduler 304 may execute after or in parallel with the procedures 550 and 565. The procedure 580 is primarily responsible for management configuration. In particular, the procedure applies principles 582-590 to configure management superframes, principles 592-596 to configure the join process, and principle 598 to configure network management command propagation.

The principle 582 applied by the procedure 580 ensures that the network management superframes have higher priority than data superframes. Next, the procedure 580 may limit the size of the network management superframe to a predefined number such as 6000 slots in accordance with the principle 584. Further, the scheduler 304 may assign the next priority to advertisement slots (principle 586). Devices may use advertisement slots to join the wireless HART network 14.

In a block 588, the procedure 580 may perform a breadth-first search of the network graph and number the devices in the order in which the devices are encountered. Of course, the search corresponding to the block 588 may be performed at any time after the potential wireless links are defined. As mentioned above, the indicator 406 may conveniently display the number assigned to the device next to the corresponding device symbol. Because the user may add device symbols to the canvass area 382 in any order, the procedure 580 may need to renumber devices whenever new objects are added to the network model 324.

Next, the procedure 580 may allocate slots for keep-alive messages. In general, every network device preferably has a timeslot reserved for keep-alive transmission. If a neighbor of the device does not propagate information through the device within a predefined time interval (such as 60 seconds), the device may send a keep-alive packet to the neighbor in order to verify the operational state of the neighbor.

The procedure 580 may also configure the join process by allocating slots reserved for join requests in a block 592. For each path, the procedure 580 may start from the device farthest from the gateway and advance toward the gateway along the path. In some contemplated embodiments, the procedure 580 does not provide redundancy to join request time slots. Next, the procedure 580 may similarly allocate slots for join responses; however, the procedure may now start from the gateway and move in the direction of the device farthest from the gateway. The procedure 580 may then allocate advertise packets in each device in a block 596. In one contemplated embodiment, the number of advertise packets allocated to a particular device is inversely related to the number of hops separating the device from the gateway.

In accordance with a principle 598, the procedure 580 may configure sharing of network management links with join requests and join responses. This approach will allow the scheduler 304 to use the same set of links for two distinct purposes.

The scheduler 304 may generate a master schedule including the individual schedules of the devices of the wireless HART network 14 in accordance with the principles and strategies discussed above. The network design 45 may then provide several views 356-360 which the user may select by means of the schedule submenu 348. FIG. 15 illustrates an exemplary schedule presented in a graph mode.

A graphical chart 620 may include a time slot grid 622. In the exemplary embodiment depicted in FIG. 15, each vertical line of the grid 622 corresponds to 5 timeslots. One of ordinary skill in the art will appreciate that the grid 622 may also include any scale convenient for the user, including an adjustable or enlargeable scale. A channel schedule listing 625 and a device schedule listing 627 may be disposed on the grid 622 in a horizontal direction. In other words, the network device tool 45 may depict the partitioning of channels into timeslots and the association of devices with timeslots as a horizontal time progression, with vertical lines representing consecutive 5-slot intervals. Further, each individual channel and each individual device may have a separate horizontal strip unambiguously showing timeslot allocation for the individual channel or device.

A legend 630 may illustrate the association of time slot assignments with one or more colors. Of course, the network device tool 45 may also use other methods of graphically specifying the state of each timeslot, such as using different shapes or symbols or, if the monitor 318 does not support multiple colors, by different shading techniques. In the example illustrated in FIG. 15, the legend 630 instructs the user that vertical bars of a color 632 represent timeslots reserved for exclusive use by a pair of devices and that vertical bars of color 634 represent timeslots allocated for shared use by multiple devices. The channel listing 625 includes blank spaces corresponding to unassigned timeslots and vertical bars of colors 632 and 634. In the example illustrated in FIG. 15, the chart 620 indicates by means of blank spaces and colored bars that channel 3 is scheduled for shared transmission in timeslot 11 and for exclusive transmissions in timeslots 0,1,3,5,7,10,14, 19, 35, and 39, and that the rest of the timeslots on channel 3 are available.

On the other hand, the device schedule listing 627 includes, in addition to blank spaces similarly corresponding to unassigned timeslots, vertical bars of colors 636 and 638. According to the exemplary legend 630, vertical bars of color 636 represent timeslots reserved for reception and vertical bars of color 638 represent timeslots reserved for transmission. In the example illustrated in FIG. 15, the chart 620 indicates that the device 11 is scheduled for transmission in timeslots 0 and 7 and for reception in timeslots 32, 34, and 39.

In some situations, the user may prefer to view the network schedule in a text format or in an XML format instead. FIG. 16A illustrates a screen 650 listing a network schedule as a series of expandable XML tags. In this example, FIGS. 16A and 17 correspond to the same network schedule of a network model which may similar but not identical to the network model 324. Referring to FIG. 16B, a screen 652 contains an expanded schedule for device 3. In addition to presenting a textual alternative to the graphical chart 620, the screen 650 and 652 may also present additional information regarding the schedules. In particular, the screen 652 includes a link-by-link listing of slot allocation for several superframes in which device 3 participates (panes 655 and 657).

Similarly, the network design tool 45 may also display routing information in the XML format. FIG. 17 illustrates an exemplary XML listing 670 of a topology of the network model 324. Each of the device panes 672 may display such essential information as device type, logical device address, and full device address on a bar 674. In the expanded mode, each pane may further display neighbor information in a neighbor pane 680 and graph information in graph panes 682. For each neighbor, the XML listing 670 may include signal quality indicator 684 next to the device address 686.

In operation, the network design tool 45 may generate the initial routing and scheduling information based on user input entered via the interactive screens 380 and 450 and in view of the predefined optimization rules 306. The network design tool 45 may reassess the initial graphs and schedules based on the feedback information regarding the performance of the wireless HART network 14 received via the live network interface 320. In this sense, the network model 324 corresponding to the wireless network 14 is an adaptive and automatically adjustable model. Further, the network design tool 45 may also adjust the network model 324 due to changes in one or more user preferences which the user may indicate by removing or adding network device and obstacle symbols to the canvass area 382 or by changing various parameters by means of the interactive screen 450.

In particular, the user may use the network design tool 45 solely for the purpose of simulating a wireless HART network. For example, a process control engineer, or other user, may explore the general utility of installing a wireless HART network in a certain environment or the efficiency of a contemplated design of a wireless HART network. By using the interactive screens 380 and 450, as well as other functions of the network design tool 45 discussed above, the user may build a network model by placing symbols representing routers, field devices, gateways, access points, obstructions to radio signals, and other relevant devices and objects in a canvass area, and easily evaluate various potential arrangements of the actual hardware. Because the user may easily move, add, and delete symbols representing devices and various objects, the user may efficiently and accurately assess the impact of such engineering decisions as, for example, reducing the fleet of routers or adding additional network access points. As indicated above, the user may also parameterize each simulated device. One familiar with the process control industry will appreciate that various devices may have different operational parameters due to the differences in device manufacturer, price, class and type of a device, as well as age of a device, power requirements of a device, and a number of other factors. Thus, in addition to assessing the difference of a certain physical arrangement relative to an alternate arrangement, the user may further assess the impact of substituting a more powerful device for a less powerful device performing a similar function, to take one example. By comparing the impact of the contemplated substitution on the simulated performance in view of such factors as the difference in price and in complexity of installation between the two alternatives, the user may make a highly informed decision and, ultimately, arrive at a better network design.

Importantly, the user of the network design tool 45 may enjoy a high level of confidence with respect to the correspondence between the network model and an actual physical wireless HART network constructed in accordance with the model. Because the routing and scheduling decisions of a wireless HART network are preferably centralized in the network manager 27, the network design tool 45 and the network manager 27 may use a similar engine 300 to carry out such functions as graph and schedule definition, graph and schedule adaptation, and other configuration decisions. It is further contemplated that the engine 300 may be provided as a software library or software object with a set of standard interfaces so that both the network manager 27 and the network design tool 45 may instantiate identical engine 300 objects inside their respective software frameworks. In some embodiments, the engine 300 may configure, adjust, and otherwise manage a network without knowing whether the network is actual (such as the wireless HART network 14) or simulated (such as the network model 324). Of course, this embodiment may further involve a module generating "dummy" burst data, dummy network management requests and other simulated data working in co-operation with (or within) the network design tool 45 in order to supply simulated network traffic to the shared engine 300.

Clearly, using the same engine 300 or, at least, some of the same components in the network manager 27 and the network design tool 45 may significantly improve the reliability of simulation. Additionally, the user may use the animation capability of the network design tool 45 to evaluate the performance of a network model over a certain period of time and, in particular, the periods when obstacles are present in the area in which the physical wireless network may operate. As discussed above, the user may simulate both the attenuation strength and the movement parameters of the obstacle, such as speed and direction. A further advantage afforded by the network design tool 45 is that the user may observe the impact of the obstacles on the simulated network visually, in an easy to understand manner. Of course, the network design tool 45 may also provide visualization to all aspects of the operation of a network model and thus of a physical wireless network. One skilled in the art will appreciate that a visual depiction of a network graph or a visual representation of a schedule may simplify the evaluation of the quality of the network model. For example, the user is more likely to recognize an inefficient path resulting from a poor arrangement of network devices if the user can view the resulting graph in a visual manner.

On the other hand, the user may further improve an existing network model by using feedback data from an actual physical network. For example, the user may have developed an initial network model and implemented the wireless HART network 14 according to the initial model. Of course, some of the physical devices may not perform in precisely the same manner as their corresponding simulacra in the network model. In particular, some of devices may detect a lower than simulated signal strength, such as 4 dB instead of the simulated 6 dB. Similarly, the wireless HART network 14 may measure the actual latency of a certain path to be 5 ms while the simulated latency of the same path is 4 ms. Moreover, the wireless HART network 14 may discover a large amount of interference on a certain channel and may, as a result, blacklist the channel and the corresponding carrier frequency. The network design tool 45 may retrieve this and other available data from the wireless HART network 14 by means of the live network interface 320 discussed above and may automatically adjust the network model. In some embodiments, the network design tool 45 may always "prefer" data from the live network interface 320 and may override the simulated parameters whenever actual data is available. Of course, some of the live data may not be always available if, for example, a certain part of the wireless HART network 45 is not yet installed or if parts of the corresponding plant are undergoing maintenance.

In this sense, the network design tool 45 may combine network simulation with live data received from the wireless HART network 14 in real time. The network design tool 45 may effectively synchronize the simulation with the live wireless HART network 14 for the parts of the network where live data is available. Meanwhile, the user may contemplate adding or removing certain network devices to the wireless HART network 14 and, in order to efficiently assess the impact of the contemplated changes on the live network, he or she may first update the network model by using the network design tool 45. In at least some of the embodiments, the network design tool 45 may recognize that although the network model does not fully correspond to a live wireless HART network reporting performance related data via the interface 320, some of the data may still be used to adjust the network model. Thus, the user may efficiently and accurately estimate the impact of adding, removing, or reconfiguring a network device on a physical network prior to actually adding, removing, or reconfiguring the device. Moreover, it is contemplated that the user may also re-arrange the existing rule priority or choose a different topology with respect to the network model which uses live feedback data. The network design tool 45 may simulate the new set of rules or the new topology by using the feedback data reported from the physical network. In this sense, the user may quickly and accurately estimate the impact of major system-wide changes on a live network in addition to more minor, device-specific changes.

It is also contemplated that the user may use the network design tool 45 in cooperation with a live network in order to populate various device specific parameters in the network model 324. In particular, the user may construct the network model 324, connect to an operation wireless HART network (such as the network 14), and direct the network design tool 45 to obtain burst rates, signal strength measurements, latency measurement, and other data from the operational wireless HART network. In this manner, the user may reduce the time required to set up a network model, as well as achieve other advantages.

Although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A tangible, non-transitory computer-readable medium having a set of instructions stored thereon, wherein the set of instructions, when executed on a processor, implement a communication modeling system, the system comprising:
   an output module that provides network configuration data as an output, the network configuration data including a communication schedule for a plurality of devices coupled to a wireless communication network;
   an interface module (i) to receive input data provided by a user that describes the plurality of devices coupled to the wireless communication network without describing a timing of communications between the plurality of devices, and (ii) to store the input data on a computer-readable medium,
   the plurality of devices including one or more field devices configured to perform control or measurement functions for a process controlled within a process control plant, and
   the wireless communication network communicatively coupled to a plant automation network of the process control plant; and
   an engine module communicatively coupled to the interface module to generate the network configuration data using the input data and a set of rules associated with a wireless communication scheme, wherein the network configuration data is used to configure the wireless communication network;
   wherein the generated network configuration data includes the communication schedule, wherein the communication schedule is generated according to the input data provided by the user and defines the timing of communications between the plurality of devices.

2. The computer-readable medium of claim 1, wherein the input data includes geographic information related to at least some of the plurality of devices, wherein the geographic information is indicative of a physical location of one of the plurality of devices relative to at least another one of the plurality of devices.

3. The computer-readable medium of claim 1, wherein the input data includes a device type for at least one of the plurality of devices; wherein the at least of the one of the plurality of devices is one of:
- a one of the one or more field devices;
- a router device that routes data between at least two of the plurality of devices without consuming or originating process control data;
- a gateway device that connects the wireless communication network to an external host; or
- a wireless access point that communicates with at least another of the plurality of devices in a wireless manner and with a gateway device in a wired manner.

4. The computer-readable medium of claim 1, wherein the input data includes at least one of the following for at least one of the plurality of devices:
- a burst rate corresponding to a rate of reporting measurements associated with process control to another one of the plurality of devices;
- a power supply type corresponding to one of a permanent power source or a non-permanent power source supplying power to the at least one of the plurality of devices; or
- a signal strength corresponding to a strength of a radio signal transmitted from the at least one of the plurality of devices.

5. The computer-readable medium of claim 1, wherein the wireless communication scheme corresponds to a wireless Highway Addressable Remote Transmitter (HART®) communication protocol that shares a common application layer with a wired HART communication protocol used by the plant automation network.

6. The computer-readable medium of claim 1, wherein the network configuration data further includes a routing scheme defining a set of communication routes between the plurality of devices;
wherein the input data includes geographic information for each of the plurality of devices; and
wherein the engine module includes: a graph generator to define direct wireless connections between pairs of the plurality of devices as a part of the routing scheme using the geographic information.

7. The computer-readable medium of claim 1, wherein the network configuration data further includes a routing scheme defining a set of communication routes between the plurality of devices;
wherein each communication route in the set of communication routes includes a directed graph connecting a pair of the plurality of devices via one or several direct wireless connections;
wherein the engine module includes: a graph generator to generate a set of directed graphs using the input data.

8. The computer-readable medium of claim 7, wherein the interface module includes:
a parameter selection routine to specify at least one of:
- a maximum number of intermediate devices to be associated with each one of the set of directed graphs;
- a maximum number of devices to consider as candidates for establishing a direct wireless connection to any one of the plurality of devices; or
- a signal strength difference value for selecting between a first communication path connecting a pair of the plurality of devices and having a first number of intermediate devices and a second communication path connecting the pair of the plurality of devices having a second number of intermediate devices greater than the first number, wherein the signal strength difference corresponds to an amount by which signal strength associated of the second communication path must exceed signal strength associated with the first communication path to prefer the second communication path to the first communication path.

9. The computer-readable medium of claim 1, wherein the engine module includes:
an Extended Mark-up Language (XML) generator to generate an XML description of the communication schedule.

10. The computer-readable medium of claim 1, wherein each of the plurality of devices communicates wirelessly with at least another one of the plurality of devices along a corresponding direct wireless connection; and wherein the engine module comprises:
a schedule generator to allocate a plurality of timeslots associated with a plurality of communication channels to the plurality of direct wireless connections as a part of the communication schedule.

11. The computer-readable medium of claim 1, wherein the engine module uses the input data to generate a network model; wherein the network model includes a plurality of nodes each corresponding to one of the plurality of devices; and wherein the interface module includes:
- a node addition routine to add a node to the plurality of nodes;
- a node removal routine to remove a node from the plurality of nodes; and
- a node positioning routine to associate one of the plurality of nodes with a geographical position relative to at least another one of the plurality of nodes; wherein each of the node addition routine, the node removal routine, and the node positioning routine is responsive to user input.

12. The computer-readable medium of claim 1, wherein the engine module uses the input data to generate a network model; and wherein the interface module communicates with an input device to receive user commands to edit the network model; and wherein the output module interacts with a display device to render a representation of the network model thereon.

13. The computer-readable medium of claim 12, wherein the engine module defines a set of direct wireless connections between pairs of the plurality of devices using the input data; and wherein the interface module includes:
a graphical user interface (GUI) routine to display the plurality of devices as a plurality of nodes interconnected by the set of direct connections.

14. The computer-readable medium of claim 1, wherein the input data includes information indicative of a physical location of a first one of the plurality of devices and a second one of the plurality of devices; and wherein the engine module estimates a quality of a wireless signal transmitted from the first one of the plurality of devices and measured at the second one of the plurality of devices using the physical location information of the first one of the plurality of devices and the second one of the plurality of devices.

15. The computer-readable medium of claim 1, wherein the interface module is a first interface module, and wherein the system further comprises:
a second interface module to receive live performance data from the wireless communication network; wherein the engine module generates the network configuration data further using the live performance data.

16. The computer-readable medium of claim 15, wherein the live performance data includes a measurement related to at least one of:

a signal strength at one of the plurality of devices; or a delay associated with propagating a message from a first one of the plurality of devices to a second one of the plurality of devices.

17. The computer-readable medium of claim 1, wherein the generated network configuration data further includes:

a routing scheme, generated according to the input data provided by the user, including a selection of a set of wireless links between pairs of the plurality of devices in view of wireless link quality and a definition of a set of communication routes between the plurality of devices.

18. A tangible, non-transitory computer-readable medium having a set of instructions stored thereon, wherein the set of instructions, when executed on a processor, implement a communication modeling system, the system comprising:

an interface module (i) to receive input data provided by a user describing a plurality of devices coupled to a wireless communication network and (ii) to store the input data on a computer-readable medium, the plurality of devices including one or more field devices configured to perform control or measurement functions for a process controlled within a process control plant, and the wireless communication network communicatively coupled to a plant automation network of the process control plant; and an engine module communicatively coupled to the interface module to generate network configuration data using the input data and a set of rules associated with a wireless communication scheme, wherein the network configuration data is used to configure the wireless communication network;

wherein the generated network configuration data includes:

a communication schedule, generated according to the input data provided by the user, that defines a timing of communications between the plurality of devices; and the system further comprising:

an output module that provides the network configuration data as an output;

wherein the engine module uses the input data to generate a network model; wherein the network model includes a plurality of nodes each corresponding to one of the plurality of devices; and wherein the interface module includes:

a node addition routine to add a node to the plurality of nodes;

a node removal routine to remove a node from the plurality of nodes;

a node positioning routine to associate one of the plurality of nodes with a geographical position relative to at least another one of the plurality of nodes; wherein each of the node addition routine, the node removal routine, and the node positioning routine is responsive to user input;

a power source type selection routine to associate a specified one of the plurality of nodes with one of a first type of a power source or a second type of a power source; and a power factor selection routine to associate the first type with a first value of a power factor and the second type with a second value of the power factor; and wherein the engine module includes:

a graph generator to generate a set of directed graphs using the power factor associated with each of the plurality of devices.

19. A tangible, non-transitory computer-readable medium having a set of instructions stored thereon, wherein the set of instructions, when executed on a processor, implement a communication modeling system, the system comprising:

an interface module (i) to receive input data provided by a user describing a plurality of devices coupled to a wireless communication network and (ii) to store the input data on a computer-readable medium, the plurality of devices including one or more field devices configured to perform control or measurement functions for a process controlled within a process control plant, and the wireless communication network communicatively coupled to a plant automation network of the process control plant; and an engine module communicatively coupled to the interface module to generate network configuration data using the input data and a set of rules associated with a wireless communication scheme, wherein the network configuration data is used to configure the wireless communication network;

wherein the generated network configuration data includes:

a communication schedule, generated according to the input data provided by the user, that defines a timing of communications between the plurality of devices; and the system further comprising:

an output module that provides the network configuration data as an output;

wherein the engine module uses the input data to generate a network model; wherein the network model includes a plurality of nodes each corresponding to one of the plurality of devices; and wherein the interface module includes:

a node addition routine to add a node to the plurality of nodes;

a node removal routine to remove a node from the plurality of nodes;

a node positioning routine to associate one of the plurality of nodes with a geographical position relative to at least another one of the plurality of nodes; wherein each of the node addition routine, the node removal routine, and the node positioning routine is responsive to user input; and a topology selection routine to select a topology for the plurality of nodes including a mesh configuration, star configuration, or a mesh star configuration; wherein the engine module defines direct wireless connections between pairs of the plurality of devices to generate a routing scheme of the wireless communication network in accordance with the selected topology.

20. A tangible, non-transitory computer-readable medium having a set of instructions stored thereon, wherein the set of instructions, when executed on a processor, implement a communication modeling system, the system comprising:

an interface module (i) to receive input data provided by a user describing a plurality of devices coupled to a wireless communication network and (ii) to store the input data on a computer-readable medium, the plurality of devices including one or more field devices configured to perform control or measurement functions for a process controlled within a process control plant, and the wireless communication network communicatively coupled to a plant automation network of the process control plant; and an engine module communicatively coupled to the interface module to generate network configuration data using the input data and a set of rules associated with a wireless communication scheme, wherein the network configuration data is used to configure the wireless communication network;

wherein the generated network configuration data includes:
a communication schedule, generated according to the input data provided by the user, that defines a timing of communications between the plurality of devices; and the system further comprising:
an output module that provides the network configuration data as an output;
wherein the engine module uses the input data to generate a network model; wherein the network model includes a plurality of nodes each corresponding to one of the plurality of devices; and wherein the interface module includes:
a node addition routine to add a node to the plurality of nodes;
a node removal routine to remove a node from the plurality of nodes;
a node positioning routine to associate one of the plurality of nodes with a geographical position relative to at least another one of the plurality of nodes; wherein each of the node addition routine, the node removal routine, and the node positioning routine is responsive to user input; and
a threshold input routine to associate a specified one of the plurality of nodes with a threshold signal strength value; and wherein the engine module includes:
a graph generator that defines a unidirectional wireless connection to the specified one of the plurality of nodes corresponding to a destination from another one of the plurality of nodes corresponding to a source only if a projected strength of a signal from the source to the destination exceeds the threshold signal strength.

21. A computer-implemented method of designing a wireless mesh communication network for a process control environment using network configuration data that includes a communication schedule for a plurality of wireless devices, the method comprising:
obtaining input data provided by a user, the input data descriptive of the plurality of wireless devices associated with the process control environment and coupled to the wireless mesh communication network but not descriptive of a timing of communications for the plurality of wireless devices, the plurality of wireless devices including at least one field device configured to perform a control function within a process or to perform a measurement of the process, the process being controlled within the process control environment, and the wireless mesh communication network communicatively coupled to a plant automation network of the process control environment; and
automatically applying a set of rules associated with a communication scheme to the input data to generate network configuration data used to configure the plurality of wireless devices to wirelessly communicate in the process control environment, including:
defining, according to the input data provided by the user, the communication schedule of the wireless mesh communication network, wherein the communication schedule defines the timing of communications for the plurality of wireless devices; and the method further comprising:
providing the network configuration data as output.

22. The method of claim 21, wherein obtaining the input data for each of the plurality of wireless devices includes:
receiving a device type indication corresponding to one of a predefined types of a wireless device from the plurality of wireless devices; and
receiving a location indication corresponding to a physical location of the wireless device from the plurality of wireless devices relative to the plurality of devices.

23. The method of claim 22, wherein receiving the device type indication includes receiving the device type indication corresponding to one of: the at least one field device, a router device that routes process control data originated by a first one of the plurality of devices and addressed to another one of the plurality of devices, a gateway device that connects the wireless mesh communication network to an external host, or a wireless access point that communicates with at least another of the plurality of devices in a wireless manner and with a gateway device in a wired manner.

24. The method of claim 22, wherein obtaining the input data for each of the plurality of wireless devices further includes:
receiving a power level indication corresponding to a power level of a wireless signal transmitted by the wireless device from the plurality of wireless devices.

25. The method of claim 21, wherein obtaining the input data includes:
providing a display interface to the user, comprising:
providing a canvass area on the display; and
providing an interactive menu having a plurality of user selectable functions including at least a first function to add a representation of a device to a selected location within the canvass area and a second function to remove a selected representation of a device from the canvass area.

26. The method of claim 25, wherein providing the interactive menu further includes providing a third function to add a representation of an obstacle to a selected location within the canvass area; wherein the obstacle positioned between a first one of the plurality of devices and a second one of the plurality of devices attenuates a wireless signal transmitted between the first and second devices.

27. The method of claim 21, further comprising generating a set of graphs, including generating a set of directed graphs connecting pairs of the plurality of devices.

28. The method of claim 27, further comprising:
displaying at least one of a graphical representation or a textual representation of the plurality of devices and of the set of directed graphs on a display interface.

29. The method of claim 27, wherein defining the communication schedule of the wireless mesh communication network includes allocating a plurality of timeslots associated with a set of wireless channels to the plurality of devices to define a communication schedule of the wireless mesh communication network.

30. The method of claim 27, wherein obtaining the input data for at least some of the plurality of devices includes:
obtaining a power level indication corresponding to a power level of a transmitted wireless signal; and wherein generating a set of directed graphs connecting pairs of the plurality of devices includes:
defining a plurality of direct wireless connections between pairs of the plurality of devices, comprising:
evaluating a plurality of potential direct wireless connections at each of the plurality of devices by calculating a strength of a signal received at each of the plurality of devices from another one of the plurality of devices using the corresponding power level indication; and
selecting direct wireless connections from the plurality of potential direct wireless connections based on at least the calculated strength of the signal; and
associating a subset of the plurality of direct wireless connections with each directed graph in the set of directed graphs.

31. The method of claim 21, further comprising:
receiving feedback data from the wireless mesh communication network; and
updating the generated network configuration data based on the received feedback data.

32. The method of claim 31, wherein receiving the feedback data includes receiving a set of measurements of data propagation delay in the wireless mesh communication network.

33. The method of claim 31, wherein receiving the feedback data includes receiving a set of signal strength measurements from at least some of the plurality of devices.

34. The method of claim 21, further comprising:
providing a display interface to the user;
receiving a design constraint from the display interface; and wherein
the defining the communication schedule of the wireless mesh communication network includes defining the communication schedule of the wireless mesh communication network in view of the design constraint.

35. The method of claim 21, wherein automatically applying a set of rules associated with a communication scheme to the input data to generate network configuration data used to configure the plurality of wireless devices to wireles sly communicate in the process control environment further includes:
generating a set of graphs to define a routing scheme of the wireless mesh communication network.

36. A computer-implemented method of designing a wireless mesh communication network for a process control environment, the method comprising:
obtaining input data provided by a user and descriptive of a plurality of wireless devices associated with the process control environment and coupled to the wireless mesh communication network, the plurality of wireless devices including at least one field device configured to perform a control function within a process or to perform a measurement of the process, the process being controlled within the process control environment, and the wireless mesh communication network communicatively coupled to a plant automation network of the process control environment; and
automatically applying a set of rules associated with a communication scheme to the input data to generate network configuration data used to configure the plurality of wireless devices to wirelessly communicate in the process control environment, including:
defining, according to the input data provided by the user, a communication schedule of the wireless mesh communication network; and the method further comprising: providing the network configuration data as output;
wherein obtaining the input data for each of the plurality of wireless devices includes:
(i) receiving a device type indication corresponding to one of a predefined types of each of the plurality of wireless devices; and
(ii) receiving a location indication corresponding to a physical location of each of the plurality of wireless devices relative to the plurality of devices;
wherein obtaining the input data for each of the plurality of wireless devices further includes: receiving a power source selection indicative of type of a power source that supplies power to the device.

37. A computer-implemented method of designing a wireless mesh communication network for a process control environment, the method comprising:
obtaining input data provided by a user and descriptive of a plurality of wireless devices associated with the process control environment and coupled to the wireless mesh communication network, the plurality of wireless devices including at least one field device configured to perform a control function within a process or to perform a measurement of the process, the process being controlled within the process control environment, and the wireless mesh communication network communicatively coupled to a plant automation network of the process control environment; and
automatically applying a set of rules associated with a communication scheme to the input data to generate network configuration data used to configure the plurality of wireless devices to wirelessly communicate in the process control environment, including:
defining, according to the input data provided by the user, a communication schedule of the wireless mesh communication network; and the method further comprising:
providing the network configuration data as output;
wherein obtaining the input data includes:
(i) providing a display interface to the user,
(ii) providing a canvass area on the display; and
(iii) providing an interactive menu having a plurality of user selectable functions including at least a first function to add a representation of a particular device to a selected location within the canvass area and a second function to remove the representation of the particular device from the canvass area;
wherein providing the interactive menu further includes providing a third function to specify a rate at which the particular device originates process control data.

38. A computer-implemented method of designing a wireless mesh communication network for a process control environment, the method comprising:
obtaining input data provided by a user and descriptive of a plurality of wireless devices associated with the process control environment and coupled to the wireless mesh communication network, the plurality of wireless devices including at least one field device configured to perform a control function within a process or to perform a measurement of the process, the process being controlled within the process control environment, and the wireless mesh communication network communicatively coupled to a plant automation network of the process control environment; and
automatically applying a set of rules associated with a communication scheme to the input data to generate network configuration data used to configure the plurality of wireless devices to wirelessly communicate in the process control environment, including:
defining, according to the input data provided by the user, a communication schedule of the wireless mesh communication network; and the method further comprising:
(i) providing the network configuration data as output; and
(ii) generating a set of graphs, including generating a set of directed graphs connecting pairs of the plurality of devices;
wherein the plurality of devices includes a gateway device to communicate with a host external to the wireless mesh communication network; and wherein generating the set of directed graphs connecting pairs of the plurality of devices includes:
(a) generating a first set of upstream directed graphs connecting each of the plurality of devices with the gateway device; and
(b) generating a second set of downstream directed graphs connecting the gateway device to each of the plurality of devices.

39. A computer-implemented method of designing a wireless mesh communication network for a process control environment, the method comprising:
obtaining input data provided by a user and descriptive of a plurality of wireless devices associated with the process control environment and coupled to the wireless mesh communication network, the plurality of wireless devices including at least one field device configured to perform a control function within a process or to perform a measurement of the process, the process being controlled within the process control environment, and the wireless mesh communication network communicatively coupled to a plant automation network of the process control environment; and
automatically applying a set of rules associated with a communication scheme to the input data to generate network configuration data used to configure the plurality of wireless devices to wirelessly communicate in the process control environment, including:
defining, according to the input data provided by the user, a communication schedule of the wireless mesh communication network; and the method further comprising:
providing the network configuration data as output; the method further comprising:
(i) providing a display interface to the user; and
(ii) receiving a design constraint from the display interface;
wherein applying the set of rules to the input data includes generating a routing scheme and the communication schedule for the wireless mesh communication network in view of the design constraint;
wherein the design constraint includes one of a maximum number of intermediate devices associated with a directed graph connecting a pair of the plurality of devices; a maximum number of devices having a direct wireless connection to any one of the plurality of devices; or a minimum number of devices to consider at one of the plurality of devices when defining a directed graph from the one of the plurality of devices to another one of the plurality of devices.

40. A tangible, non-transitory computer-readable medium having a set of instructions stored thereon, wherein the set of instructions, when executed on a processor, implement a communication modeling system for designing a wireless communication network for a process control environment using network configuration data that includes a communication schedule for a plurality of wireless devices, the system comprising:
a user interface module to receive input data provided by a user, the input data descriptive of the plurality of wireless devices associated with the process control environment but not descriptive of a timing of communications of the plurality of wireless devices, the plurality of wireless devices coupled to the wireless communication network and including at least one field device configured to perform a control function within a process or to perform a measurement of the process, the process being controlled within the process control environment, and the wireless communication network coupled to a plant automation network of the process control environment; and
an engine module communicatively coupled to the user interface module to automatically generate network configuration data using the input data for the plurality of wireless devices;
wherein the network configuration data is used to configure the plurality of wireless devices and includes the communication schedule, and wherein the communication schedule is defined according to the input data provided by the user to define the timing of communication of the plurality of devices; the engine module including:
a graph generator to define a plurality of direct wireless connections between pairs of the plurality of devices and to generate a set of directed graphs using the plurality of direct wireless connections; and
a schedule generator to associate a plurality of timeslots with a plurality of communication channels, and to allocate the plurality of timeslots to the plurality of direct wireless connections defined by the graph generator.

41. The computer-readable medium of claim 40, wherein the wireless communication network applies a set of rules associated a wireless Highway Addressable Remote Transmitter (HART®)communication protocol to generate the network configuration data, the wireless HART communication protocol sharing a common application layer with a wired HART communication protocol used by the plant automation network.

42. The computer-readable medium of claim 40, wherein the input data descriptive of the plurality of devices includes:
data corresponding to the at least one field device; and
data corresponding to a gateway device communicatively coupled to an external host operating outside the wireless communication network.

43. The computer-readable medium of claim 42, wherein the user interface module includes a burst rate selection routine to associate a specified one of the plurality of devices with a rate of reporting measurements associated with process control to the gateway device.

44. The computer-readable medium of claim 40, wherein the communication schedule includes:
a set of dedicated timeslots corresponding to an exclusive use by a pair of the plurality of devices on the corresponding communication channel; and
a set of shared timeslots corresponding to a shared use by two or more of the plurality of devices on the corresponding communication channel.

45. The computer-readable medium of claim 40, wherein the generated network configuration data further includes:

a routing scheme defined according to the input data provided by the user as a set of communication paths connecting pairs of the plurality of devices.

46. A tangible, non-transitory computer-readable medium having a set of instructions stored thereon, wherein the set of instructions, when executed on a processor, implement a communication modeling system for designing a wireless communication network for a process control environment, the system comprising:
- a user interface module to receive input data provided by a user and descriptive of a plurality of wireless devices associated with the process control environment and to store the input data on a computer-readable medium, the plurality of wireless devices coupled to the wireless communication network and including at least one field device configured to perform a control function within a process or to perform a measurement of the process, the process being controlled within the process control environment, and the wireless communication network coupled to a plant automation network of the process control environment; and
- an engine module communicatively coupled to the user interface module to automatically generate network configuration data using the input data for the plurality of wireless devices; wherein the network configuration data is used to configure the plurality of wireless devices and includes a communication schedule defined according to the input data provided by the user to define timing of communication of the plurality of devices; the engine module including:
  - a graph generator to define a plurality of direct wireless connections between pairs of the plurality of devices and to generate a set of directed graphs using the plurality of direct wireless connections; and
  - a schedule generator to associate a plurality of timeslots with a plurality of communication channels, and to allocate the plurality of timeslots to the plurality of direct wireless connections defined by the graph generator;
- wherein the communication schedule includes:
  - (i) a set of dedicated timeslots corresponding to an exclusive use by a pair of the plurality of devices on the corresponding communication channel; and
  - (ii) a set of shared timeslots corresponding to a shared use by two or more of the plurality of devices on the corresponding communication channel;
- wherein the user interface module includes:
  - a graphical user interface (GUI) routine to graphically render the generated communication schedule, wherein the GUI renders a first set of dedicated timeslots using a first graphic and renders a second set of dedicated timeslots using a second graphic; wherein the first graphic and the second graphic differ in at least one of a color, a shape, or a size.

47. A tangible, non-transitory computer-readable medium having a set of instructions stored thereon, wherein the set of instructions, when executed on a processor, implement a software tool for designing a mesh communication network that includes a plurality of devices operating in a process control plant, the tool comprising:
- an interface module to facilitate, based on input data provided to the interface module by a user describing the plurality of devices without describing a timing of communications for the plurality of devices, creation or modification of an interactive model of the mesh communication network, wherein:
  - the interactive model is stored as data on a computer-readable medium,
  - the mesh communication network is coupled to a plant automation network of the process control plant, and
  - the plurality of devices is coupled to the mesh communication network and the plurality of devices includes at least one field device configured to perform a control function within a process or to perform a measurement of the process, the process being controlled within the process control plant; and
- an engine module communicatively coupled to the interface module to automatically generate a parameter set for operating the mesh communication network based on the interactive model, the parameter set including a communication schedule, the communication schedule generated according to the input data provided by the user and defining the timing of communications for the plurality of devices.

48. The computer-readable medium of claim 47, wherein the parameter set is associated with at least one of a routing scheme of the mesh communication network or the communication schedule.

49. The computer-readable medium of claim 48, wherein the engine module includes:
- a graph generator to define direct wireless connections between pairs of the plurality of devices using at least a geographic information associated with each of the plurality of devices and stored as a part of the interactive model; wherein the routing scheme includes the defined direct wireless connections.

50. The computer-readable medium of claim 48, wherein the engine module includes:
- a graph generator to generate a set of directed graphs connecting pairs of the plurality of devices via one or several direct wireless connections to define the routing scheme of the mesh communication network.

51. The computer-readable medium of claim 47, wherein the interface module includes:
- a node addition routine to add a node to a plurality of nodes of the interactive model corresponding to the plurality of devices coupled to the mesh communication network;
- a node removal routine to remove a node from the plurality of nodes; and
- a node positioning routine to associate one of the plurality of nodes with a geographical position relative to at least another one of the plurality of nodes; wherein each of the node addition routine, the node removal routine, and the node positioning routine is responsive to user input.

52. The computer-readable medium of claim 47, wherein the interface module includes:
- a graphical user interface (GUI) routine to display the interactive model as a plurality of nodes interconnected by a set of direct connections corresponding to the parameter set generated by the engine module.

53. The computer-readable medium of claim 47, wherein the generated parameter set further includes:
- a routing scheme generated according to the input data provided by the user.

54. A tangible, non-transitory computer-readable medium having a set of instructions stored thereon, wherein the set of instructions, when executed on a processor, implement a communication modeling system for use in configuring a wireless communication network for a process control plant, the system comprising:

an interface module to receive input data provided by a user describing a plurality of devices associated with the process control plant and to store the input data on a computer-readable medium, the input data including indications of relative distances between devices included in the plurality of devices, the plurality of devices including a field device configured to perform a control function within a process or to perform a measurement of the process, the process being controlled within the process control plant, the plurality of devices coupled to the wireless communication network, and the wireless communication network communicatively coupled to a plant automation network of the process control plant; and an engine module communicatively coupled to the interface module to generate network configuration data using the input data and a set of rules associated with a wireless communication scheme, wherein the network configuration data is used to configure the wireless communication network;

wherein:

(i) the generated network configuration data includes at least one of:

a routing scheme including a selection of a set of wireless links between pairs of the plurality of devices in view of wireless link quality and a definition of a set of communication routes between the plurality of devices, and a communication schedule that defines a timing of communications of the plurality of device;

(ii) the engine module uses the input data to generate a network model, wherein the network model includes a plurality of nodes each corresponding to one of the plurality of devices, wherein the interface module includes:

a node addition routine to add a node to the plurality of nodes; a node removal routine to remove a node from the plurality of nodes; and a node positioning routine to associate one of the plurality of nodes with a geographical position relative to at least another one of the plurality of nodes; wherein each of the node addition routine, the node removal routine, and the node positioning routine is responsive to user input; and (iii) each one in the set of communication routes is a directed graph that includes at least direct wireless connection between a pair of the plurality of devices, wherein the interface module further includes:

a power source type selection routine to associate a specified one of the plurality of nodes with one of a first type of a power source or a second type of a power source; and a power factor selection routine to associate the first type of with a first value of a power factor and the second type with a second value of the power factor; and wherein the engine module includes: a graph generator to generate a set of directed graphs using the power factor associated with each of the plurality of devices;

the system further comprising:

an output module that provides the network configuration data as an output.

55. A tangible, non-transitory computer-readable medium having a set of instructions stored thereon, wherein the set of instructions, when executed on a processor, implement a communication modeling system for use in configuring a wireless communication network for a process control plant, the system comprising:

an interface module to receive input data provided by a user describing a plurality of devices associated with the process control plant and to store the input data on a computer-readable medium, the input data including indications of relative distances between devices included in the plurality of devices, the plurality of devices including a field device configured to perform a control function within a process or to perform a measurement of the process, the process being controlled within the process control plant, the plurality of devices coupled to the wireless communication network, and the wireless communication network communicatively coupled to a plant automation network of the process control plant; and an engine module communicatively coupled to the interface module to generate network configuration data using the input data and a set of rules associated with a wireless communication scheme, wherein the network configuration data is used to configure the wireless communication network;

wherein:

(i) the generated network configuration data includes at least one of:

a routing scheme including a selection of a set of wireless links between pairs of the plurality of devices in view of wireless link quality and a definition of a set of communication routes between the plurality of devices, and a communication schedule that defines a timing of communications of the plurality of device;

(ii) the engine module uses the input data to generate a network model, wherein the network model includes a plurality of nodes each corresponding to one of the plurality of devices, wherein the interface module includes:

a node addition routine to add a node to the plurality of nodes; a node removal routine to remove a node from the plurality of nodes; and a node positioning routine to associate one of the plurality of nodes with a geographical position relative to at least another one of the plurality of nodes; wherein each of the node addition routine, the node removal routine, and the node positioning routine is responsive to user input; and (iii) the interface module further includes:

a topology selection routine to select a topology for the plurality of nodes including a mesh configuration, star configuration, or a mesh star configuration; wherein the engine module defines direct wireless connections between pairs of the plurality of devices to generate a routing scheme of the wireless communication network in accordance with the selected topology;

the system further comprising:

an output module that provides the network configuration data as an output.

56. A tangible, non-transitory computer-readable medium having a set of instructions stored thereon, wherein the set of instructions, when executed on a processor, implement a communication modeling system for use in configuring a wireless communication network for a process control plant, the system comprising:

an interface module to receive input data provided by a user describing a plurality of devices associated with the process control plant and to store the input data on a computer-readable medium, the input data including indications of relative distances between devices included in the plurality of devices, the plurality of devices including a field device configured to perform a control function within a process or to perform a measurement of the process, the process being controlled within the process control plant, the plurality of devices coupled to the wireless communication network, and the wireless communication network communicatively coupled to a plant automation network of the process control plant; and an engine module communicatively coupled to the interface module to generate network configuration data using the input data and a set of rules associated with a wireless communication scheme, wherein the network configuration data is used to configure the wireless communication network;

wherein:

(i) the generated network configuration data includes at least one of:

a routing scheme including a selection of a set of wireless links between pairs of the plurality of devices in view of wireless link quality and a definition of a set of communication routes between the plurality of devices, and a communication schedule that defines a timing of communications of the plurality of device;

(ii) the engine module uses the input data to generate a network model, wherein the network model includes a plurality of nodes each corresponding to one of the plurality of devices, wherein the interface module includes:

a node addition routine to add a node to the plurality of nodes; a node removal routine to remove a node from the plurality of nodes; and a node positioning routine to associate one of the plurality of nodes with a geographical position relative to at least another one of the plurality of nodes; wherein each of the node addition routine, the node removal routine, and the node positioning routine is responsive to user input; and (iii) the engine module uses the input data to generate a network model, wherein:

the interface module further includes a threshold input routine to associate a specified one of the plurality of nodes with a threshold signal strength value; and the engine module includes a graph generator that defines a unidirectional wireless connection to the specified one of the plurality of nodes corresponding a destination from another one of the plurality of devices corresponding to a source only if a projected strength of a signal from the source to the destination exceeds the threshold signal strength;

the system further comprising:

an output module that provides the network configuration data as an output.

57. A computer-implemented method of designing a wireless mesh communication network for a process control environment, the method comprising:

obtaining input data provided by a user and descriptive of a plurality of wireless devices associated with the process control environment and coupled to the wireless mesh communication network, the input data including an indication of a relative distance between a pair of wireless devices included in the plurality of wireless devices, the plurality of wireless devices including at least one field device configured to perform a control function within a process or to perform a measurement of the process, the process being controlled within the process control environment, and the wireless mesh communication network communicatively coupled to a plant automation network of the process control environment; and automatically applying a set of rules associated with a communication scheme to the input data to generate network configuration data used to configure the plurality of wireless devices to wirelessly communicate in the process control environment, including at least one of:

generating a set of graphs to define a routing scheme of the wireless mesh communication network, and defining a communication schedule of the wireless mesh communication network; and the method further comprising:

providing the network configuration data as output;

wherein:

(i) obtaining the input data for each of the plurality of wireless devices includes: receiving a device type indication corresponding to one of a predefined types of a particular device; and receiving a location indication corresponding to a physical location of the particular device relative to the plurality of devices; and (ii) obtaining the input data for each of the plurality of wireless devices further includes receiving a power source selection indicative of type of a power source that supplies power to the particular device.

58. A computer-implemented method of designing a wireless mesh communication network for a process control environment, the method comprising:

obtaining input data provided by a user and descriptive of a plurality of wireless devices associated with the process control environment and coupled to the wireless mesh communication network, the input data including an indication of a relative distance between a pair of wireless devices included in the plurality of wireless devices, the plurality of wireless devices including at least one field device configured to perform a control function within a process or to perform a measurement of the process, the process being controlled within the process control environment, and the wireless mesh communication network communicatively coupled to a plant automation network of the process control environment; and automatically applying a set of rules associated with a communication scheme to the input data to generate network configuration data used to configure the plurality of wireless devices to wirelessly communicate in the process control environment, including at least one of:

generating a set of graphs to define a routing scheme of the wireless mesh communication network, and defining a communication schedule of the wireless mesh communication network; and the method further comprising:

providing the network configuration data as output wherein:

(i) obtaining the input data includes providing a display interface to the user, comprising: providing a canvass area on the display; and providing an interactive menu having a plurality of user selectable functions including at least a first function to add a representation of a particular device to a selected location within the canvass area and a second function to remove the representation of the particular device from the canvass area; and (ii) providing the interactive menu further includes providing a third function to specify a rate at which the particular device originates process control data.

59. A computer-implemented method of designing a wireless mesh communication network for a process control environment, the method comprising:

obtaining input data provided by a user and descriptive of a plurality of wireless devices associated with the process control environment and coupled to the wireless mesh communication network, the input data including an indication of a relative distance between a pair of wireless devices included in the plurality of wireless devices, the plurality of wireless devices including at least one field device configured to perform a control function within a process or to perform a measurement of the process, the process being controlled within the process control environment, and the wireless mesh communication network communicatively coupled to a plant automation network of the process control environment; and automatically applying a set of rules associated with a communication scheme to the input data to generate network configuration data used to configure the plurality of wireless devices to wirelessly communicate in the process control environment, including at least one of:

generating a set of graphs to define a routing scheme of the wireless mesh communication network, and
defining a communication schedule of the wireless mesh communication network; and the method further comprising:
providing the network configuration data as output;
wherein:
(i) generating a set of graphs includes generating a set of directed graphs connecting pairs of the plurality of devices; and
(ii) the plurality of devices includes a gateway device to communicate with a host external to the wireless mesh communication network; and wherein generating the set of directed graphs connecting pairs of the plurality of devices includes:
generating a first set of upstream directed graphs connecting each of the plurality of devices with the gateway device; and
generating a second set of downstream directed graphs connecting the gateway device to each of the plurality of devices.

60. A computer-implemented method of designing a wireless mesh communication network for a process control environment, the method comprising:

obtaining input data provided by a user and descriptive of a plurality of wireless devices associated with the process control environment and coupled to the wireless mesh communication network, the input data including an indication of a relative distance between a pair of wireless devices included in the plurality of wireless devices, the plurality of wireless devices including at least one field device configured to perform a control function within a process or to perform a measurement of the process, the process being controlled within the process control environment, and the wireless mesh communication network communicatively coupled to a plant automation network of the process control environment; and automatically applying a set of rules associated with a communication scheme to the input data to generate network configuration data used to configure the plurality of wireless devices to wireles sly communicate in the process control environment, including at least one of:

generating a set of graphs to define a routing scheme of the wireless mesh communication network, and
defining a communication schedule of the wireless mesh communication network; and the method further comprising:
providing the network configuration data as output;
providing a display interface to the user; and
receiving a design constraint from the display interface;
wherein applying the set of rules to the input data includes generating the routing scheme and the communication schedule for the communication network in view of the design constraint;
wherein the design constraint includes one of a maximum number of intermediate devices associated with a directed graph connecting a pair of the plurality of devices; a maximum number of devices having a direct wireless connection to any one of the plurality of devices; or a minimum number of devices to consider at one of the plurality of devices when defining a directed graph from the one of the plurality of devices to another one of the plurality of devices.

61. A tangible, non-transitory computer-readable medium having a set of instructions stored thereon, wherein the set of instructions, when executed on a processor, implement a communication modeling system for designing a wireless communication network for a process control environment, the system comprising:

a user interface module to receive input data provided by a user and descriptive of a plurality of wireless devices associated with the process control environment and to store the input data on a computer-readable medium, the input data including respective indications of one or more relative distances between wireless devices included in the plurality of wireless devices, the plurality of wireless devices coupled to the wireless communication network and including at least one field device configured to perform a control function within a process or to perform a measurement of the process, the process being controlled within the process control environment, and the wireless communication network coupled to a plant automation network of the process control environment; and an engine module communicatively coupled to the user interface module to automatically generate network configuration data using the input data for the plurality of wireless devices; wherein the network configuration data is used to configure the plurality of wireless devices and includes a routing scheme defined as a set of communication paths connecting pairs of the plurality of devices and a communication schedule to define timing of communication of the plurality of devices; the engine module including:

a graph generator to define a plurality of direct wireless connections between pairs of the plurality of devices and to generate a set of directed graphs using the plurality of direct wireless connections; and a schedule generator to associate a plurality of timeslots with a plurality of communication channels, and to allocate the plurality of timeslots to the plurality of direct wireless connections defined by the graph generator;

wherein:
(i) the communication schedule includes:
(a) a set of dedicated timeslots corresponding to an exclusive use by a pair of the plurality of devices on the corresponding communication channel, and (b) a set of shared timeslots corresponding to a shared use by two or more of the plurality of devices on the corresponding communication channel; and (ii) the user interface module includes:

a graphical user interface (GUI) routine to graphically render the generated communication schedule, wherein the GUI renders a first set of dedicated timeslots using a first graphic and renders a second set of dedicated timeslots using a second graphic; wherein the first graphic and the second graphic differ in at least one of a color, a shape, or a size.

* * * * *